United States Patent
Maeda et al.

(10) Patent No.: US 10,930,152 B2
(45) Date of Patent: Feb. 23, 2021

(54) TRAVEL CONTROL SYSTEM

(71) Applicant: Hitachi, Ltd., Tokyo (JP)

(72) Inventors: Kenta Maeda, Tokyo (JP); Junya Takahashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/615,064

(22) PCT Filed: Jun. 20, 2017

(86) PCT No.: PCT/JP2017/022648
§ 371 (c)(1),
(2) Date: Nov. 19, 2019

(87) PCT Pub. No.: WO2018/235154
PCT Pub. Date: Dec. 27, 2018

(65) Prior Publication Data
US 2020/0111363 A1      Apr. 9, 2020

(51) Int. Cl.
  *G08G 1/16*      (2006.01)
  *G08G 1/0967*   (2006.01)
  (Continued)

(52) U.S. Cl.
  CPC ........... *G08G 1/163* (2013.01); *G08G 1/0145* (2013.01); *G08G 1/04* (2013.01);
  (Continued)

(58) Field of Classification Search
  CPC ................. G08G 1/163; G08G 1/0145; G08G 1/096708; G08G 1/164; G08G 1/166
  (Continued)

(56) References Cited

U.S. PATENT DOCUMENTS 6,405,132 B1 * 6/2002 Breed ................... G01S 7/4802
                                                                    701/301
10,493,985 B2 * 12/2019 Yokoyama ......... G06K 9/00335
(Continued)

FOREIGN PATENT DOCUMENTS

JP    2008-249666 A    10/2008
JP    2015-075890 A    4/2015
(Continued)

OTHER PUBLICATIONS

International Search Report with English translation and Written Opinion issued in corresponding application No. PCT/JP2017/022648 dated Sep. 26, 2017.

*Primary Examiner* — John A Tweel, Jr.
(74) *Attorney, Agent, or Firm* — Foley & Lardner LLP

(57) ABSTRACT

The present invention increases detectable areas and increases vehicle speed while ensuring safety, thereby enhancing vehicle utility for drivers. The present invention is provided with: an information integration means which collects and integrates external observation information received from observation entities; a reliability calculation means which calculates the reliability of the observation information; an observation information transmission means which transmits the observation information and the calculated reliability to a travel control device via communications; an operation ascertaining means which ascertains an operation performed by an operator; a surroundings information acquisition means which acquires information about the surroundings of a host vehicle; a vehicle information acquisition means which acquires vehicle information indicating the traveling state of the host vehicle; a communication means which acquires the observation information and said reliability from an observation information integration device via communications; a travel area management means which manages areas that can be traveled by the host (Continued)

vehicle; and a travel control means which controls the travel of the host vehicle on the basis of said ascertained operation, the areas that can be traveled by the host vehicle, said surroundings information, the vehicle information, the observation information, and travel areas.

14 Claims, 22 Drawing Sheets

(51) Int. Cl.
    *G08G 1/01*         (2006.01)
    *G08G 1/04*         (2006.01)

(52) U.S. Cl.
    CPC ....... *G08G 1/096708* (2013.01); *G08G 1/164* (2013.01); *G08G 1/166* (2013.01)

(58) Field of Classification Search
    USPC ........................................................ 701/117
    See application file for complete search history.

(56) References Cited

U.S. PATENT DOCUMENTS

| | | |
|---|---|---|
| 2010/0174486 A1 | 7/2010 | Wakabayashi |
| 2016/0259335 A1 | 9/2016 | Oyama |

FOREIGN PATENT DOCUMENTS

| | | |
|---|---|---|
| JP | 2016-143092 A | 8/2016 |
| JP | 2016-162299 A | 9/2016 |
| WO | WO-2017/029847 A1 | 2/2017 |

\* cited by examiner (A) HOST VEHICLE 21 AND DETECTION INFORMATION FROM FIXED POINT OBSERVATION CAMERA 61

(B) POSITIONS OF HOST VEHICLE 21 AND FIXED POINT OBSERVATION CAMERA 61 AND TRAVELING ANGLE (C) IMAGE OF OBSERVATION INFORMATION 14 AFTER INTEGRATING OBSERVATION INFORMATION (A) EXAMPLES OF OBSERVING MOVING BODY BY CAMERA 22 AND FIXED POINT OBSERVATION CAMERA 61

(B) ONE EXAMPLE OF CORRECTION INFORMATION GENERATED FOR FIXED POINT OBSERVATION CAMERA 61

POSITIONS IN TRAVELING DIRECTION (A) OBSERVATION AREAS OF CAMERA 22 AND FIXED OBSERVATION CAMERA 61

(B) CORRECTION INFORMATION FOR FIXED POINT OBSERVATION CAMERA 61 (PAST THREE PIECES)

(C) SPEED OF HOST VEHICLE 21

TRAVEL CONTROL SYSTEM

TECHNICAL FIELD

The present invention relates to a travel control system which includes: an observation information integration device that integrates observation information from a plurality of observation entities; and a travel control device that realizes automated traveling inexpensively by using the integrated observation information.

BACKGROUND ART

Conventionally, a technique has been known, in which information for correcting a host vehicle position is received from a device installed on a road by using communication or the like, and vehicle travel control is performed at a safe and practical speed by using map information and sensors mounted on the vehicle. For example, PTL 1 discloses a technique in which a host vehicle position is corrected based the reliability of the host vehicle position obtained from a roadside device (a camera or the like installed on a road). Moreover, PTL 2 discloses a technique in which travel control is performed by using forward recognition result depending on the accuracy of forward recognition by a camera or the like mounted on a vehicle, or by using a map. When the map is used, the speed is decided according to the reliability of the map to continue the travel control while increasing safety.

CITATION LIST

Patent Literature

PTL 1: JP 2008-249666 A
PTL 2: JP 2016-162299 A

SUMMARY OF INVENTION

Technical Problem

With the combination of the two conventional techniques described in PTL 1 and PTL 2, observation information for the travel control from the roadside device is interpolated to enable traveling at a practical speed while ensuring safety even when the accuracy of the forward recognition or a detection area is small in the host vehicle. However, the accuracy of the information obtained from the roadside device varies depending on the type of the roadside device and the like, and the value of the reliability is not always obtained. If the speed is decided by using the observation information without determining the reliability of the roadside device, this may possibly lead to sudden braking and abrupt steering to avoid an object, which is caused by an error in the observation information.

The present invention has been made in light of the above circumstances, and an object thereof is to provide a travel control system which includes: an observation information integration device that appropriately determines an error in a host vehicle position or an object position acquired from a roadside device; and a travel control device that makes traveling at a safe and practical speed in response to the error.

Solution to Problem

In order to achieve the above object, a travel control system according to the present invention includes an observation information integration device and a travel control device. The observation information integration device includes: an information integration means for collecting and integrating external observation information from at least one observation entity of a host vehicle, another vehicle or a roadside observation device; a reliability calculation means for calculating reliability of the observation information; and an observation information transmission means for transmitting the observation information and the reliability to the travel control device via communication. The travel control device includes: an operation ascertaining means for ascertaining an operation performed by an operator; a surroundings information acquisition means for acquiring surroundings information around the host vehicle; a vehicle information acquisition means for acquiring vehicle information indicating a traveling state of the host vehicle; a communication means for acquiring the observation information including the reliability from the observation information integration device via communication and transmitting the surroundings information to the observation information integration device via communication; a travel area management means for managing a travelable area of the host vehicle based on at least one of the operation, the surroundings information, the vehicle information or the observation information; and a travel control means for controlling travel of the host vehicle based on the operation, the travelable area, the surroundings information, the vehicle information, the observation information and a travel area.

Advantageous Effects of Invention

According to the present invention, the recognition region is expanded by integrating the forward recognition information of the host vehicle and the observation information, thereby enabling traveling at a practical speed by increasing a speed higher than that of a case where only a sensor mounted on the host vehicle is used, while ensuring safety. Moreover, since the speed is appropriately decided based on the deviation between the forward recognition information and the observation information, it is possible to reduce the risk of sudden braking and abrupt steering.

Problems, configurations and effects other than those described above will be apparent from the following description of the embodiments.

DESCRIPTION OF EMBODIMENTS

Hereinafter, the embodiments of the present invention will be described based on the drawings.

Example 1

First, Example 1, which is one example of an observation information integration device and a travel control device of the present invention, will be described using FIGS. 1 to 15.

Figure 1:
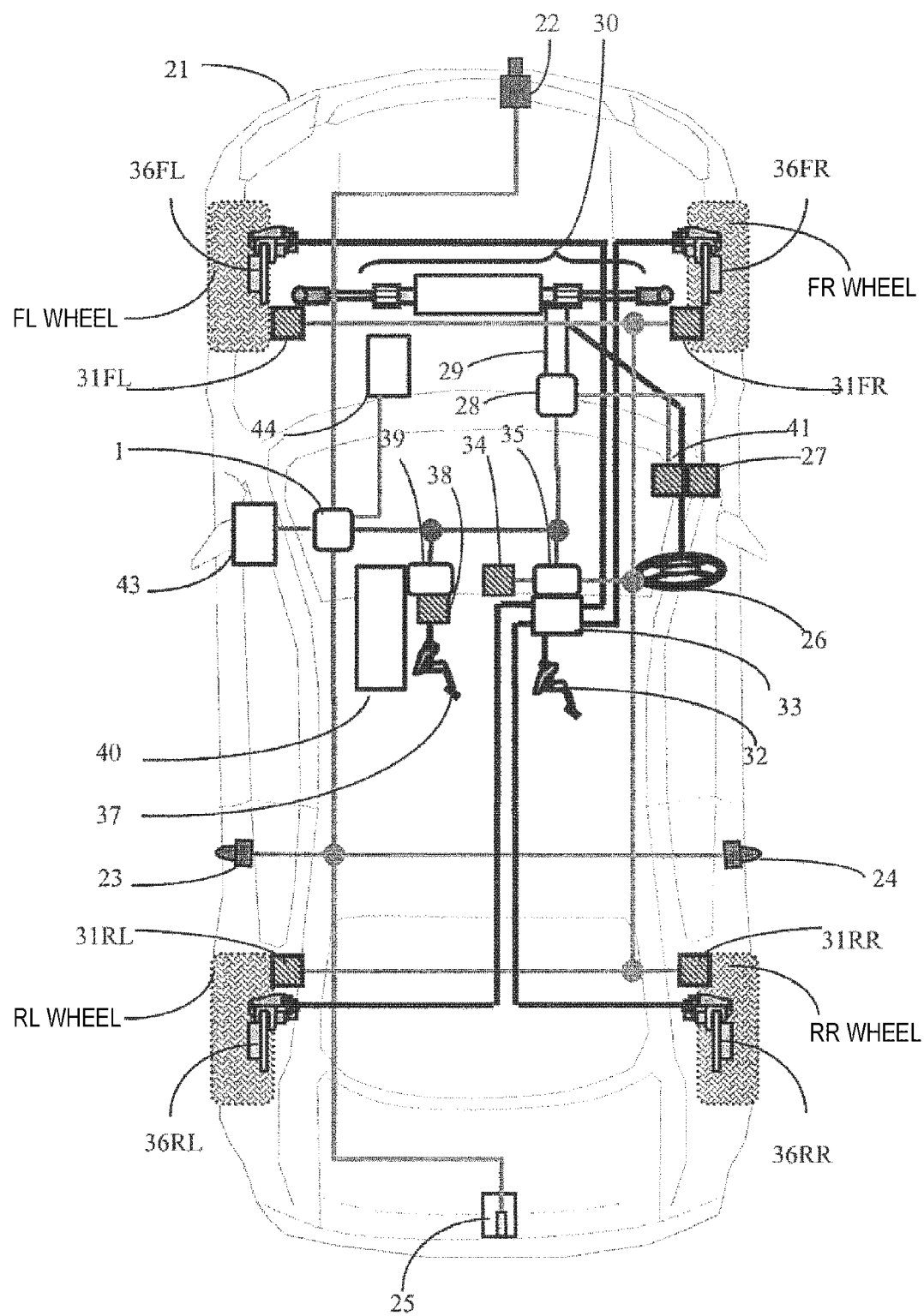
FIG. 1 is an explanatory diagram showing the entire configuration of a vehicle on which an observation information integration device and a travel control device according to Example 1 of the present invention are mounted.

FIG. 1 is an explanatory diagram showing the entire configuration of a vehicle (sometimes referred to as a host vehicle) 21 as a controlled object on which the travel control device according to Example 1 of the present invention is mounted. A FL wheel, a FR wheel, a RL wheel and a RR wheel mean the front left wheel, the front right wheel, the rear left wheel and the rear right wheel, respectively.

The vehicle 21 is provided with a vehicle travel control device 1 that computes, based on information from sensors 22, 23, 24 and 25 that recognize the surroundings, command values for a steering control mechanism 30, a brake control mechanism 33 and a throttle control mechanism 40 to control the traveling direction of the vehicle 21. The vehicle 21 is also provided with a steering control device 28, a brake control device 35, an acceleration control device 39 and a display device 44. The steering control device 28 controls the steering control mechanism 30 based on the command value from the travel control device 1. The brake control device 35 controls the brake control mechanism 33 based on the command value and adjusts the braking force distribution to each wheel. The acceleration control device 39 controls the throttle control mechanism 40 based on the command value and adjusts the torque output of the engine. The display device 44 displays a travel plan and the like of the host vehicle 21.

For example, by installing fisheye cameras 22 to 25 with a viewing angle of 180° as the respective sensors 22, 23, 24 and 25 that recognize the surroundings, it is possible to detect relative distances and relative speeds of objects such as vehicles, bicycles, pedestrians and obstacles existing around the host vehicle 21. Moreover, the vehicle 21 is provides with a communication device 43 that performs road-to-vehicle or vehicle-to-vehicle communication. Note that this Example 1 shows the combination of the above sensors as one example of the sensor configuration, but the sensor configuration is not limited thereto and may be a combination of ultrasonic sensors, stereo cameras, infrared cameras, or the like, or a laser radar capable of sensing around 360° may be mounted on the ceiling of the vehicle 21. The sensor signals (signals output from the sensor) are inputted into the travel control device 1.

Although not shown in detail in FIG. 1, the travel control device 1 has, for example, a CPU, a ROM, a RAM and an input/output device. The ROM stores a flow of vehicle travel control described using FIG. 2. As the details will be described later, the travel control device 1 computes a command value for each actuator (the steering control mechanism 30, the brake control mechanism 33 and the throttle control mechanism 40) for controlling the vehicle travel according to the generated travel plan. The control devices (the steering control device 28, the brake control device 35 and the acceleration control device 39) of the respective actuators 30, 33 and 40 receive the command values from the travel control device 1 via communication and control the respective actuators 30, 33 and 40 based on the command values.

Next, the brake operation of the vehicle 21 will be described. In a state where a driver is driving the vehicle 21, the stepping force by the driver stepping on a brake pedal 32 is boosted by a brake booster (not shown), and the hydraulic pressure corresponding to the force is generated by a master cylinder (not shown). The generated hydraulic pressure is supplied to, via the brake control mechanism 33, wheel cylinders 36FL, 36FR, 36RL and 36RR provided at the respective wheels. The wheel cylinders 36FL to 36RR are constituted by cylinders, pistons, pads, disk rotors and the like (not shown). The pistons are propelled by the hydraulic fluid supplied from the master cylinder, and the pads linked to the pistons are pressed by the disk rotors. Note that the disc rotors rotate together with the wheels. Therefore, the brake torque acting on the disc rotors becomes braking forces acting between the wheels and the road surface. Thus, the braking force can be generated for each wheel according to the brake pedal operation by the driver. Note that, in the vehicle on which the present invention is mounted, it is not always necessary to mount a brake booster or a master cylinder. The brake pedal 32 and the brake control mechanism 33 may be directly connected to form a mechanism in which the brake control mechanism 33 is directly operated when the driver steps on the brake pedal 32.

Although not shown in detail in FIG. 1, the brake control device 35 has, for example, a CPU, a ROM, a RAM and an input/output device, like the travel control device 1. Inputted into the brake control device 35 are sensor signals from a combine sensor 34, wheel speed sensors 31FL, 31FR, 31RL and 31RR and a steering wheel angle detection device 41 via the steering control device 28 described later, a braking force command value from the above-described travel control device 1, and the like. The combine sensor 34 can detect longitudinal acceleration, lateral acceleration and a yaw rate. The wheel speed sensors 31FL, 31FR, 31RL and 31RR are installed at the respective wheels. Moreover, the output of the brake control device 35 is connected to the brake control mechanism 33 having a pump (not shown) and a control valve, and an arbitrary braking force can be generated on each wheel independently of the brake pedal operation by the driver. The travel control device 1 sends a brake command (value) to the brake control device 35 via communication so that an arbitrary braking force can be generated for the vehicle 21, and this takes a role of automatic braking for automated driving without the operation by the driver. However, this example is not limited to the above brake control device, and other actuators such as a brake-by-wire may be used.

Next, the steering operation of the vehicle 21 will be described. In a state where the driver is driving the vehicle 21, the steering torque and the steering wheel angle inputted by the driver through a steering wheel 26 are detected by a steering torque detection device 27 and the steering wheel angle detection device 41, respectively. Based on these pieces of information, the steering control device 28 controls a motor 29 to generate assist torque. Note that, although not shown in detail in FIG. 1, the steering control device 28 also has, for example, a CPU, a ROM, a RAM and an input/output device, like the travel control device 1. The steering control mechanism 30 is moved by the resultant force of the steering torque by the driver and the assist torque by the motor 29, and the front wheels (the FL and FR wheels) are turned. Meanwhile, the reaction force from the road surface is conveyed to the steering control mechanism 30 according to the turning angle of the front wheels and is conveyed to the driver as the road surface reaction force. Note that, in the vehicle on which the present invention is mounted, it is not always necessary to mount the steering torque detection device 27, and a mechanism may be adopted in which, when the driver operates the steering wheel 26, the steering control device 28 does not operate and no assist torque is generated (so-called heavy steering).

The steering control device 28 can control the steering control mechanism 30 by generating torque with the motor 29 independently of the steering operation by the driver. Therefore, the travel control device 1 sends a steering force command (value) to the steering control device 28 via communication so that the front wheels can be controlled to an arbitrary turning angle, and this takes a role of performing automatic steering for automated driving without the operation by the driver. However, this example is not limited to the above steering control device, and other actuators such as a brake-by-wire may be used.

Next, the accelerator operation of the vehicle 21 will be described. The depression amount of an accelerator pedal 37 by the driver is detected by a stroke sensor 38 and inputted into the acceleration control device 39. Note that, although not shown in detail in FIG. 1, the acceleration control device 39 also has, for example, a CPU, a ROM, a RAM and an input/output device, like the travel control device 1. The acceleration control device 39 controls the engine by adjusting the throttle opening according to the depression amount of the accelerator pedal 37. Thus, the vehicle 21 can be accelerated according to the accelerator pedal operation by the user. Moreover, the acceleration control device 39 can control the throttle opening independently of the accelerator operation by the driver. Therefore, the vehicle travel control device 21 sends an acceleration command (value) to the acceleration control device 39 via communication so that arbitrary acceleration can be generated for the vehicle 21, and this takes a role of automatic acceleration for automated driving without the operation by the user. Note that the vehicle on which the present invention is mounted is not necessarily an engine vehicle, and the main driving device may be an electric motor. In this case, the acceleration control device 39 calculates a motor torque command value according to the depression amount of the accelerator pedal 37 and performs current control so that an inverter device (not shown) realizes the motor torque command value.

Note that the vehicle in which the steering wheel 26, the accelerator pedal 37 and the brake pedal 32 are mounted on the vehicle has been described in the above description, but these input devices may not be installed in the vehicle. In this case, the vehicle is a fully autonomous driving car without the operation by the driver, or a remote driving car that travels in response to a remote travel command.

Figure 2:
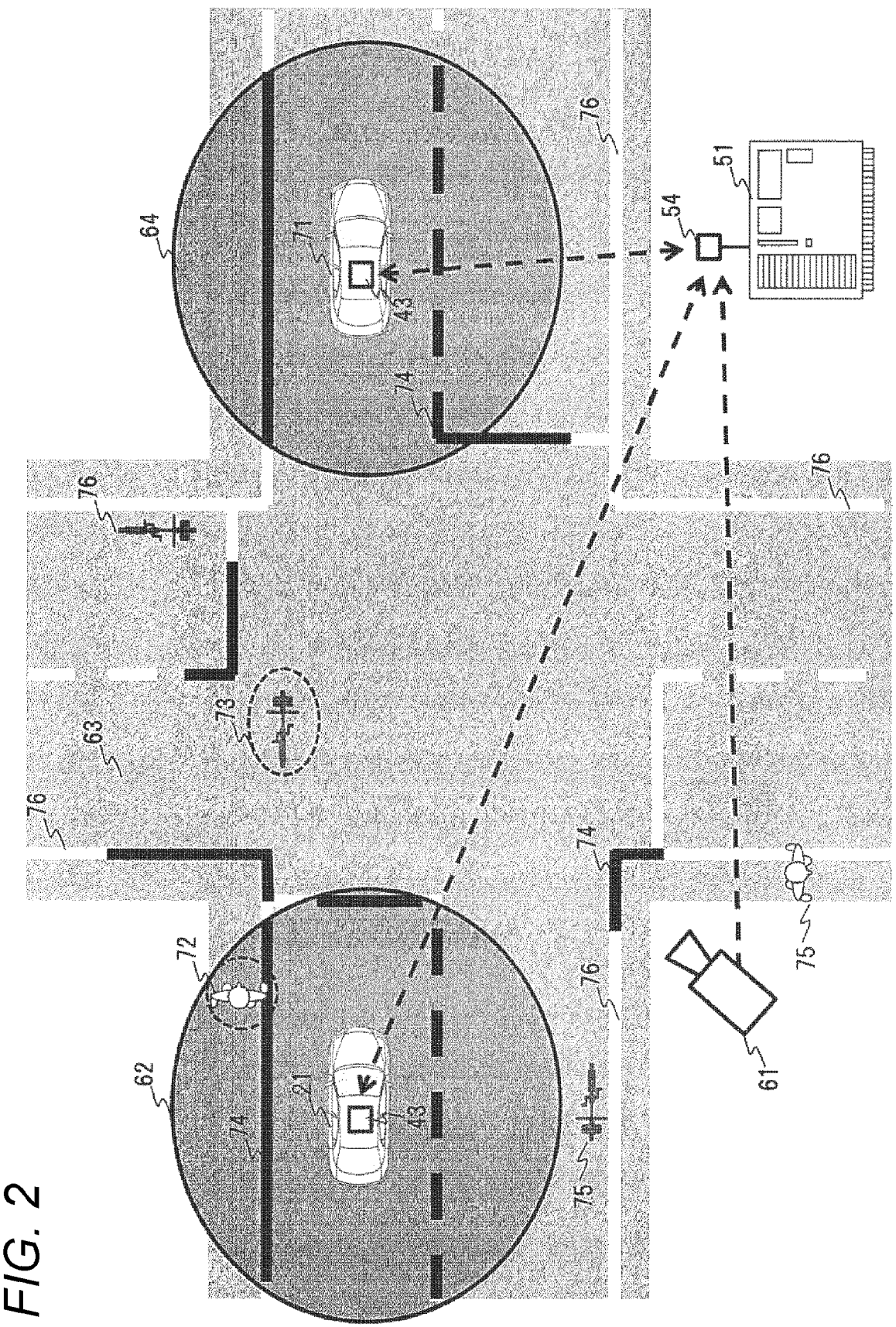
FIG. 2 is an explanatory diagram showing the entire configurations of the observation information integration device and the travel control device according to Example 1 of the present invention.

FIG. 2 is an explanatory diagram showing an installation image of an observation information integration device 51 and the host vehicle 21 according to Example 1 of the present invention. The observation information integration device 51 is, for example, a cloud computer installed outside (herein, defined as "roadside") the host vehicle 21 and is installed in an arbitrary building or a box installed on the side of a road. The host vehicle 21 and the observation information integration device 51 are each provided with the communication device 43 and a communication means 54. As the details will be described later, at least vehicle information 11, which is host vehicle positional information and the like on the host vehicle 21, and surroundings information 12, which is information on objects and the like detected by the sensors 22 to 25 mounted on the host vehicle 21, are transmitted to the observation information integration device 51 from the host vehicle 21 via communication.

As shown in FIG. 2, the observation information integration device 51 collects not only information from the host vehicle, but also collectable information such as observation information from a fixed point observation camera 61 and the like installed at an intersection, an entrance of a building, and the like, a position of another vehicle 71 having the communication device 43, and surroundings detection information. The detected information is transmitted as observation information 14 to the host vehicle 21, another vehicle 71 and the like. Examples of the observation information 14 include moving bodies 72 and 73 (the moving body detected by the host vehicle is defined as the moving body 72, and the moving body detected by the fixed point observation camera, another vehicle and the like is defined as the moving body 73) such as pedestrians and bicycles existing on the road, road marking paint 74 (white lines and the like), and the like.

All the observation entities, including the host vehicle 21, another vehicle 71 and the fixed point observation camera 61, have respective observation information detection areas which are illustrated in FIG. 2 as a surroundings information detection area 62 of the host vehicle 21, an angular field 63 of the fixed point observation camera 61, and a surroundings information detection area 64 of another vehicle 71. A moving body 75, road marking paint 76 and the like existing outside of these areas are not acquired by the observation information integration device 51. In FIG. 2, the total area of the observation information detection area 63 and the surroundings information detection areas 62 and 64 which can be collected by the observation information integration device 51 is larger than the surroundings information detection area 62 of the host vehicle 21, and the host vehicle 21 can acquire a farther object position. Specifically, only the moving body 72 can be detected in the surroundings information detection area 62 of the host vehicle, but the moving body 72 and the moving body 73 can be detected by the observation information integration device 51.

Figure 3:
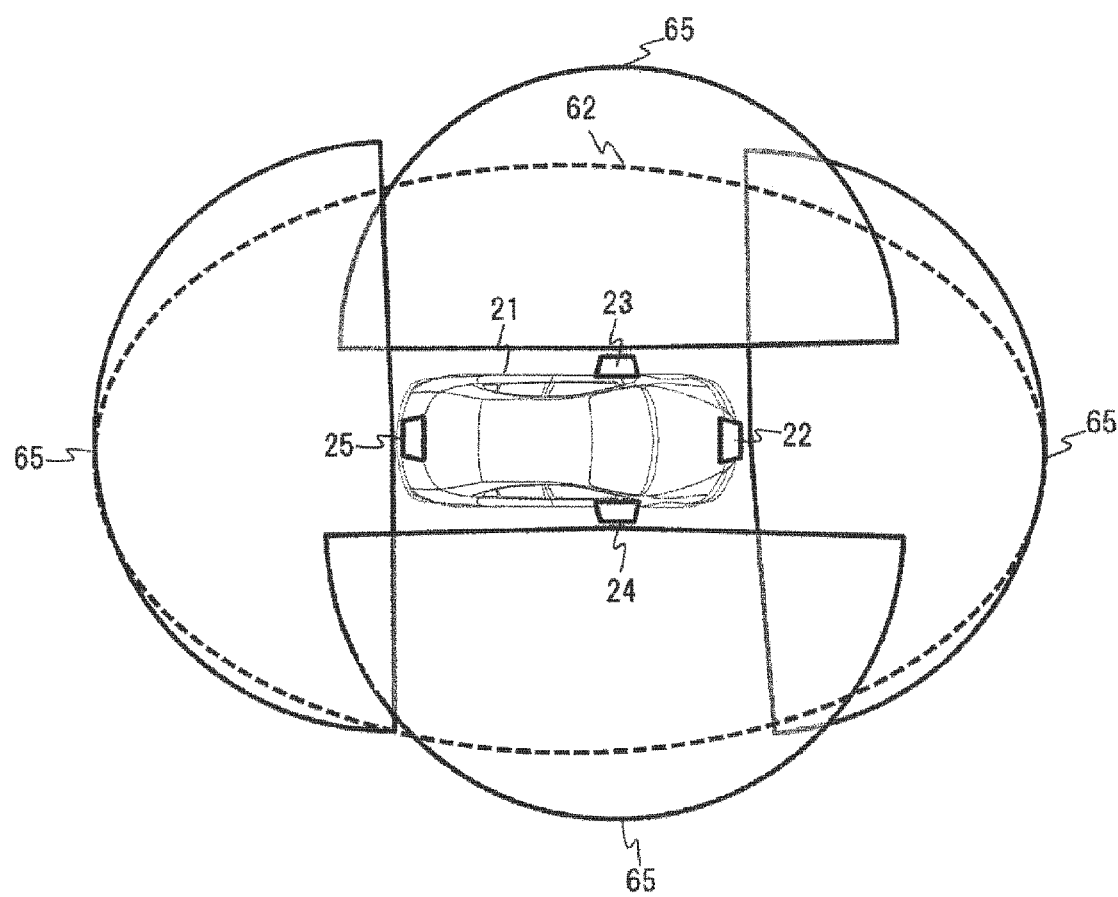
FIG. 3 is an explanatory diagram showing the definition of the surroundings information detection area 62 of a host vehicle 21.

FIG. 3 is a diagram showing the definition of the surroundings information detection area 62 of the host vehicle 21. Herein, an image diagram shown in a case where all the sensors 22 to 25 are fisheye cameras capable of detecting 180°. A detection area 65 of each camera is indicated by a semicircular region. Although there are some regions that overlap with the detection areas of other cameras, almost entire 360° region around the host vehicle is covered. A region that is within the angular field of at least one camera is indicated by the elliptical broken line in FIG. 2, and this region is defined as the surroundings information detection area 62.

Figure 4:
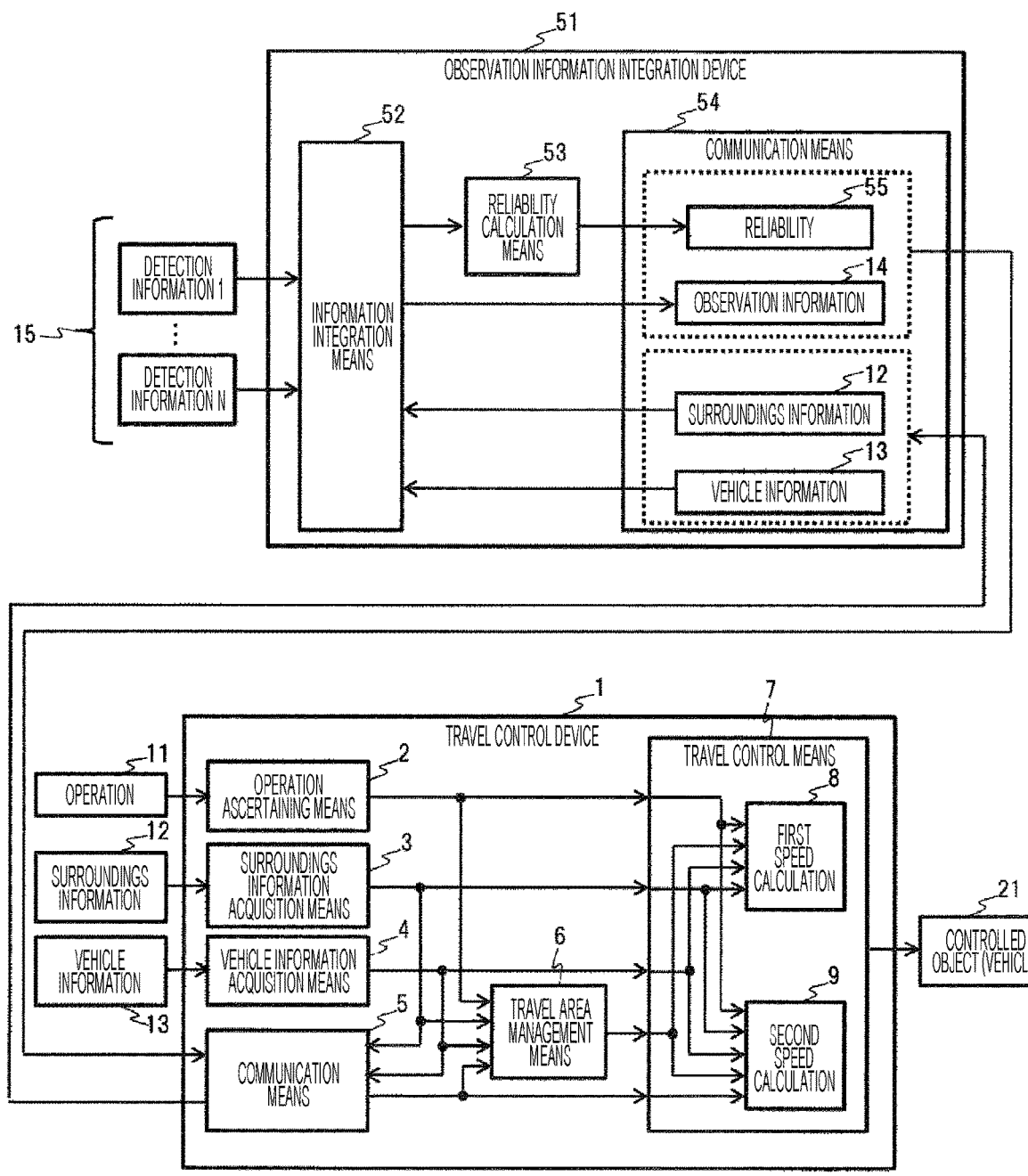
FIG. 4 is a block diagram showing the configurations of the observation information integration device and the travel control device according to Example 1 of the present invention.

FIG. 4 is a block diagram showing the partial configurations of the observation information integration device and the travel control device according to Example 1 of the present invention. In Example 1 shown in FIG. 4, the travel control device 1 includes at least an operation ascertaining means 2, a surroundings information acquisition means 3, a vehicle information acquisition means 4, a communication means 5, a travel area management means 6 and a travel control means 7.

The operation ascertaining means 2 ascertains an operation 11 by the driver and stores the operation 11 in a storage device (a ROM, a RAM, or the like (not shown)) in the travel control device. Specific examples of the operation 11 include the steering torque and the steering wheel angle inputted by the driver via the steering wheel 26, the depression amount of the accelerator pedal 37 by the driver, the stepping force by the driver stepping on the brake pedal 32, and the like. Moreover, a touch panel display, buttons, switches and the like may be provided as devices for inputting the driver's intention and selection contents or for presenting information to the driver.

The surroundings information acquisition means 3 acquires the surroundings information 12 by at least one of the sensors 22 to 25. Then, from the acquired surroundings information 12, positional information and the size of an object (an obstacle or the like) around the host vehicle 21 and, when the obstacle is a moving body, the position, speed information and the like of the moving body are obtained. Moreover, when a road sign, road marking paint, a traffic light, or the like is detected, the position or type thereof is obtained. When image data of the camera 22 is used, it is possible to simultaneously identify the types of a plurality of objects to acquire the information. In particular, a stereo camera using two cameras is advantageous because the stereo camera can detect the relative distance and relative speed of a moving body or an obstacle. The obtained surroundings information 12 is stored in the storage device.

The vehicle information acquisition means 4 specifies the current position of the host vehicle 21, acquires the operation state quantity and stores the current position and the operation state quantity in the storage device. The current position specifying processing (processing for specifying the position and traveling angle of the host vehicle 21) acquires the current position by, for example, a GPS (not shown). The traveling angle can be acquired along the time course of the positional information while moving, and the traveling angle of the vehicle can be acquired by attaching two GPSs to the front and the back even when the vehicle is stopped. Meanwhile, specific examples of the operation state quantity acquired in the operation state quantity acquisition processing include speed, longitudinal acceleration, lateral acceleration, a yaw rate, a yaw angle and the like acquired from the combine sensor 34.

The communication means 5 acquires the observation information 14 and reliability 55 of each piece of observation information from the observation information integration device 51 via the communication device 43 and stores the observation information 14 and the reliability 55 in a storage device. At the same time, the surroundings information 12 and vehicle information 13 stored in the storage device are transmitted to the observation information integration device 51. At least the moving bodies 72 and 73, the road marking paint 74, sign information (not shown) and the like detected around the host vehicle are transmitted and received as the surroundings information 12 and the observation information 14. Moreover, at least the current position and the traveling angle of the host vehicle 21 are transmitted as the vehicle information 13. For a communication method, a communication system dedicated to road-to-vehicle communication (a radio beacon, an optical beacon, or the like), a cellular line (a 4G line), or the like is used.

The travel area management means 6 generates a travelable area 10 (not shown) of the host vehicle 21 based on the operation 11, the surroundings information 12 and the vehicle information 13 and the observation information 14 and the reliability 55 acquired via the communication means 5 and stores the travelable area 10 in the storage device. For example, map information is used for the travelable area 10. The map information is information on the shape, traffic regulations, landmarks and the like of the road where the host vehicle 21 is scheduled to travel. The map information is utilized to generate the travel plan of the host vehicle 21 and control the travel of the host vehicle 21 according to the travel plan. For example, when the host vehicle 21 performs a right/left turn operation at a certain intersection, information on the intersection at which the host vehicle 21 makes a right/left turn is acquired. Examples of the intersection/road information include the number of road lanes at the intersection, road width, road intersection angle, lane width, median strip width, pedestrian crossing width, a setback amount from the pedestrian crossing intersection, the presence or absence of a traffic light, and the like. Alternatively, if the surroundings information 12 can be obtained as a point group of the positions of the objects around the host vehicle 21, information obtained by integrating the point group may be defined as the travelable area 10.

The travel area management means 6 may include a travel area extension means therein. As the details will be described later in Example 4, the travelable area 10 is generated based on the surroundings information 12 and the vehicle information 13, and the observation information 14 and the reliability 55 acquired via the communication means 5. When the host vehicle 21 travels for the first time, the current position and traveling angle of the host vehicle 21 are acquired by using the vehicle information 13, and the positions of an obstacle, a landmark, white lines on the road surface and the like in the vicinity of the host vehicle 21 acquired from at least one of the surroundings information 12 or the observation information 14 are converted into absolute coordinates with reference to the ground. These pieces of information converted into the coordinates are integrated as the travelable area 10 of the host vehicle 21. When the host vehicle 21 travels for the second and subsequent times, the current position and the traveling angle of the host vehicle 21 are estimated or modified based on the travelable area 10 generated up to the previous travel, and then the surroundings information 12 and the observation information 14 are converted into absolute coordinates.

The travel control means 7 computes a travel plan by using at least one of the operation 11, the surroundings information 12, the vehicle information 13, the observation information 14, the reliability 55 or the travelable area 10 and decides the operation of the vehicle 21 based on the travel plan. Then, a control command value for each actuator mounted on the vehicle 21 is calculated so as to realize the operation. When this travel control device 21 is configured to directly control the actuators, a physical quantity for operating each actuator is calculated. For example, in a case of an inter-vehicle distance control system, a vehicle acceleration command value is calculated according to the setting of the inter-vehicle distance with the preceding vehicle, the maximum speed setting, and the like, and the engine throttle and the brake pressure are controlled so as to realize the acceleration command value. When Example 1 is applied to an automated driving system, the travel plan is a track and speed that the host vehicle 21 is scheduled to travel, and the steering angle command value and the vehicle acceleration command value are computed to meet the travel plan.

The travel control means 7 is further provided with a first speed calculation unit 8 and a second speed calculation unit 9. As the details will be described later, under conditions where the observation information 14 cannot be obtained, a first speed is calculated by using the operation 11, the surroundings information 12, the vehicle information 13 and the travel area 10 and set as the target speed of the host vehicle 21. On the other hand, in a region where the observation information 14 is obtained, a second speed is calculated by using the observation information 14 in addition to the operation 11, the surroundings information 12, the vehicle information 13 and the travel area 10 and set as the target speed of the host vehicle 21.

The observation information integration device 51 includes at least an information integration means 52, a reliability calculation means 53 and a communication means 54.

The information integration means 52 stores, in a storage device (a ROM, a RAM or the like (not shown)) in the observation information integration device, the surroundings information 12 and the vehicle information 13 from the host vehicle 21 acquired by the communication means 54 described later, and detection information 15 acquired from one or a plurality of observation entities. Then, the positions and orientations of objects, including the moving bodies 72 and 73, the road marking paint 74, the signs (not shown) and the like, from the stored surroundings information 12, vehicle information 13 and detection information 15 are converted into the same coordinate system. The observation information 14 is generated by integrating the detection information on the same object acquired from the plurality of observation entities. The detection information 15 may be acquired via communication from the observation entities including the fixed point observation camera 61, another vehicle 71 and the like. Alternatively, the detection information 15 may be acquired by directly connecting a sensing device such as a camera to the observation information integration device 51.

Figure 5:
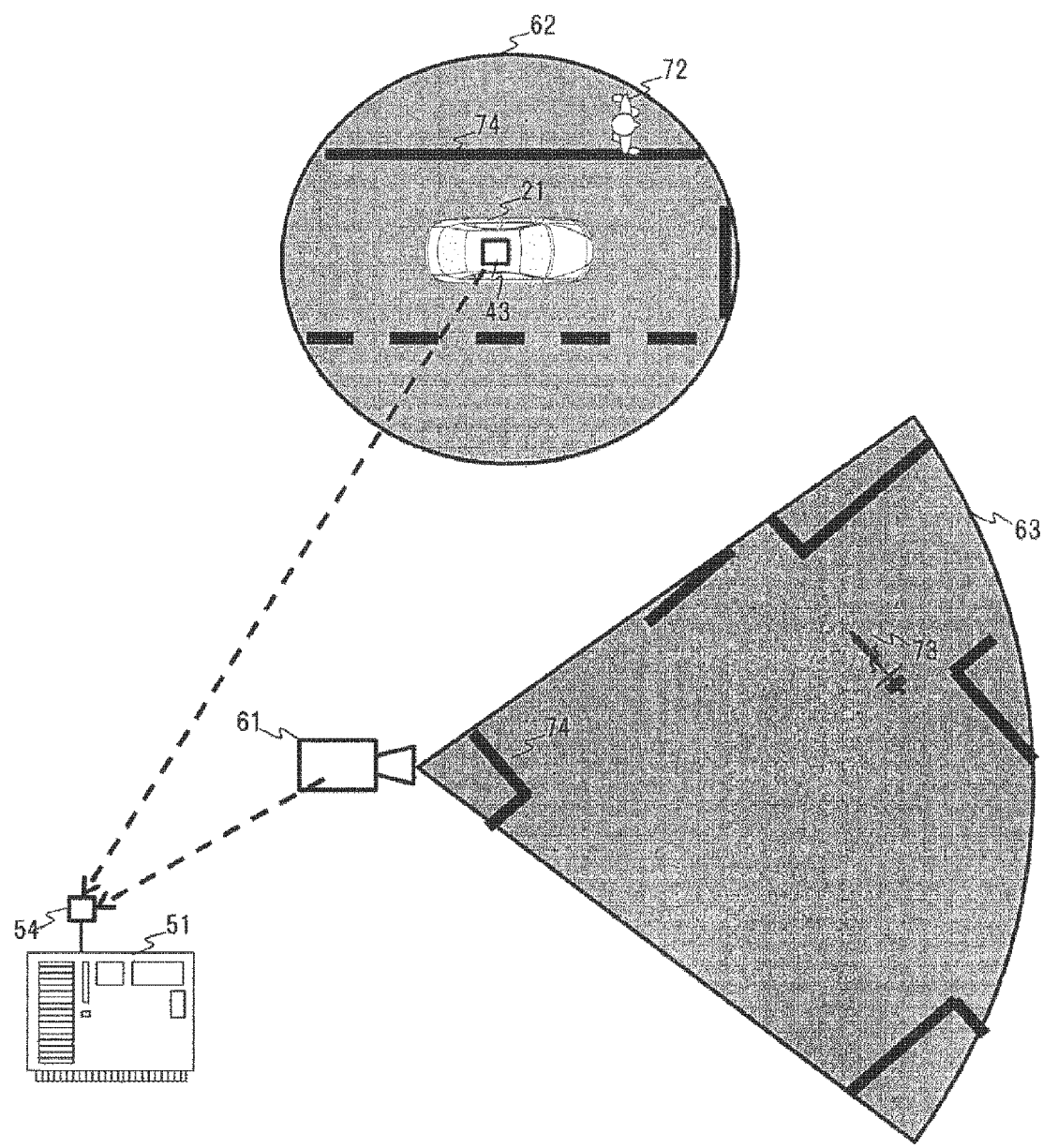
FIG. 5 is an explanatory diagram showing the behavior of the information integration means 52 in the observation information integration device and the travel control device according to Example 1 of the present invention.
Figure 6:
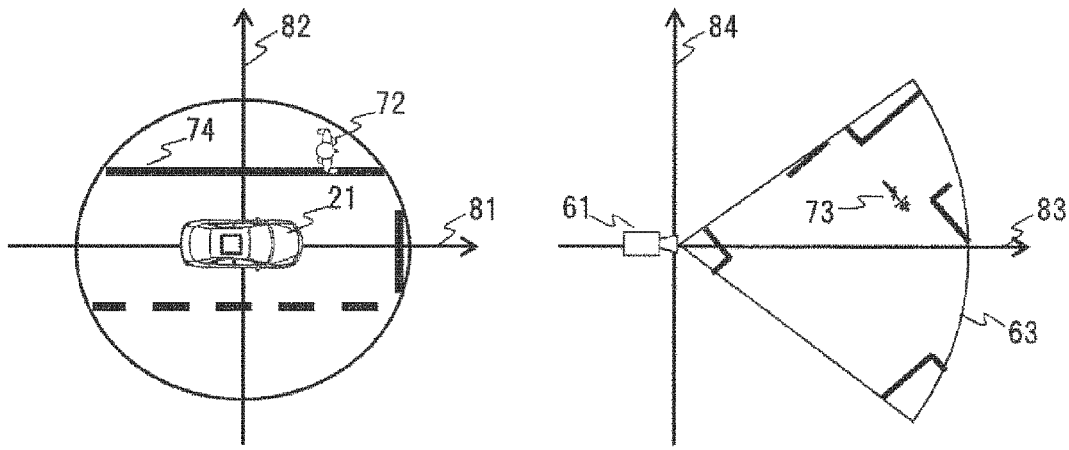
FIG. 6 is an explanatory diagram showing the behavior of the information integration means 52 in the observation information integration device and the travel control device according to Example 1 of the present invention.
Figure 6:
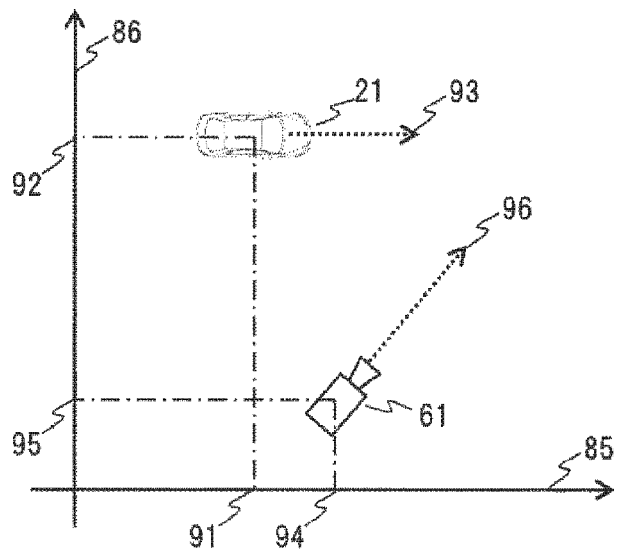
Figure 6:
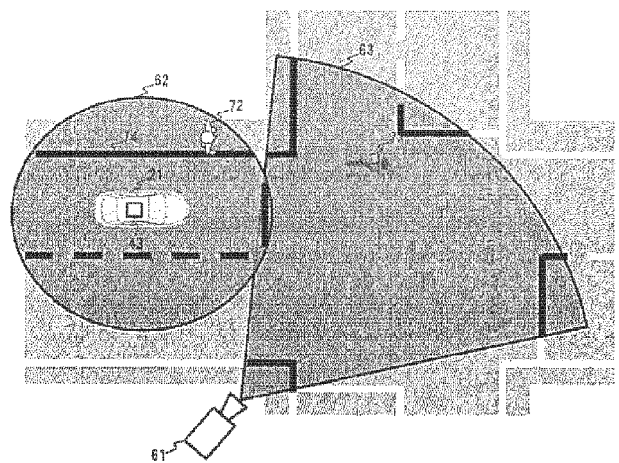

One example of the operation of the information integration means 52 will be described using FIGS. 5 and 6. Herein, suppose that the surroundings information 12 from the host vehicle 21 and the detection information 15 from the fixed point observation camera 61 installed at a place in the vicinity of the position of the host vehicle 21 are acquired. At this time, the information integration means receives the information from the host vehicle 21 and the fixed point observation camera 61 separately as shown in FIG. 5.

The surroundings information 12 from the host vehicle 21 includes information on the moving body 72, the road marking paint 74 and the like that exist within the surroundings information detection area 62. Moreover, the detection information 15 from the fixed point observation camera 61 includes information on the moving body 73, the road marking paint 74, and the like existing within the area of the angular field 63. As shown in FIG. 6(A), these pieces of information are acquired in a relative coordinate system with reference to the respective observation entities. For example, the surroundings information 12 from the host vehicle 21 is expressed in a coordinate system using orthogonal coordinates 81 and 82 with reference to the center of gravity of the host vehicle 21 or the shaft center of the rear wheels, and the detection information 15 from the fixed point observation camera 61 is expressed in a coordinate system using orthogonal coordinate systems 83 and 84 with reference to the focal position of the camera or the like.

In order to integrate the information of the different coordinate systems depending on the observation entities into the same coordinate system, absolute coordinate systems 85 and 86 of positions 91 and 92 and a traveling angle 93 of the host vehicle 21 and positions 94 and 95 and orientation 96 of the fixed point observation camera 61 are acquired as shown in FIG. 6(B) with the respective predetermined points on the ground surface as the origins. The position and traveling angle of the host vehicle 21 are acquired from the vehicle information 13. Moreover, the information on the position and orientation of the fixed point observation camera 61 is acquired by a method of acquiring a design value or mounting a GPS in the camera body. By converting both the surroundings information 12 from the host vehicle 21 and the detection information 15 from the fixed point observation camera 61 into the absolute coordinate systems 85 and 86, the observation information 14 is obtained as shown in FIG. 6(C).

The reliability calculation means 53 calculates the reliability 55 based on the deviation between the positions of the same object detected by a plurality of observation entities in the observation information 14 obtained by the integration of the information integration means 52.

Figure 7:
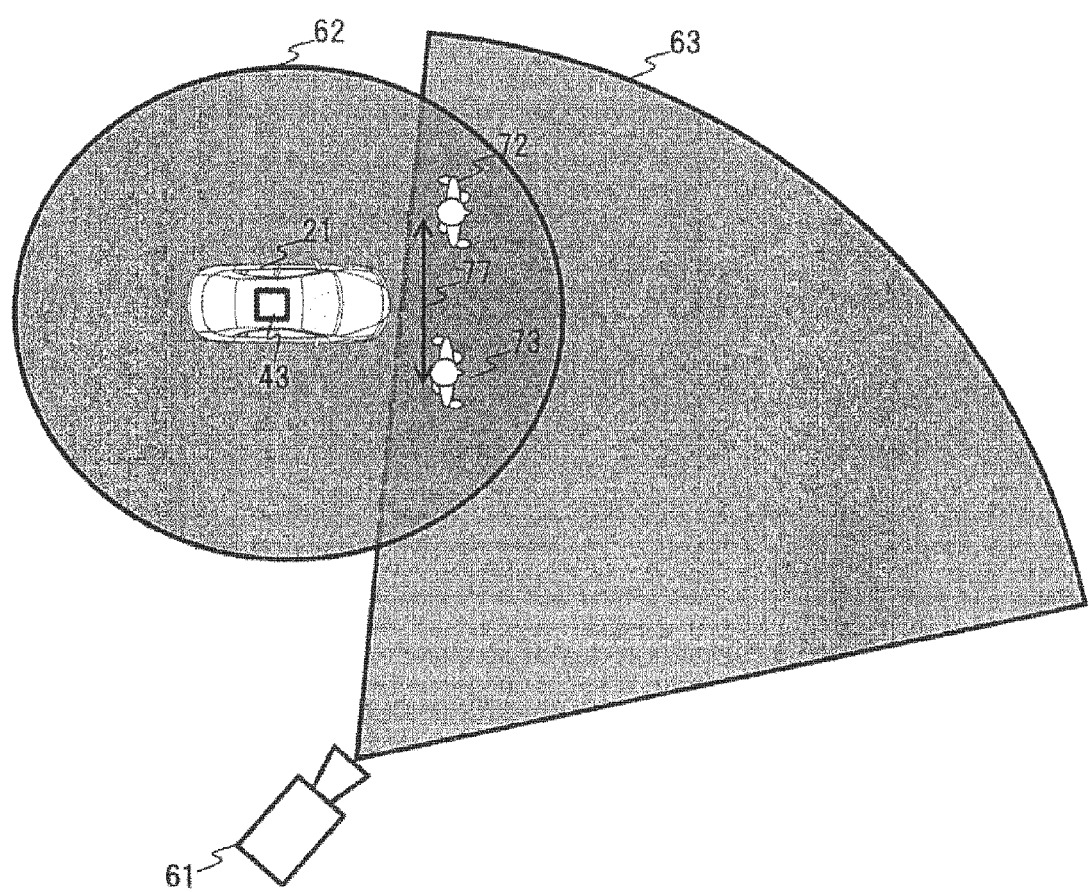
FIG. 7 is an explanatory diagram showing one example of the behavior of the reliability calculation means 53.

One example of calculating the reliability will be described using FIG. 7. In this drawing, suppose a scene where there is a region where the surroundings information detection area 62 of the host vehicle 21 and the angular field 65 of the fixed point observation camera 61 overlap, and both the moving bodies 72 and 73 are detected. When the moving bodies 72 and 73 are found to be the same moving body by using image matching or the like, there is a possibility that a position deviation 77 occurs between the moving bodies 72 and 73. This can be caused by various factors such as a calibration error of the camera 22 mounted on the host vehicle 21 and a detection error of the fixed point observation camera 61.

The reliability calculation means 53 calculates the reliability 55 based on this position deviation 77. A plurality of methods can be applied to the method of calculating the numerical value of the reliability 55. For example, the reliability 55 is a continuous number normalized to 0 to 1. When the position deviation 77 is 0, the reliability is set to 1. When the position deviation 77 is a predetermined value or more, the reliability is 0. Between 0 and 1, the position deviation can be interpolated with a linear function. Moreover, it is possible to store the time series of the positions of the moving bodies 72 and 73 for each isochronal sample, obtain the standard deviation of the position deviation 77 within a predetermined time, and set a greater value for the reliability 55 as the standard deviation is smaller. Furthermore, the reliability may be calculated by using a lookup table in which the reliability of the detection information 15 from each observation entity is stored in association with the detection position. In this case, for example, when the fixed point observation camera 61 has a characteristic that the position error becomes greater as the fixed point observation camera 61 is farther away, one example is that a lookup table in which the reliability becomes smaller as the fixed point observation camera 61 is farther away is set in advance.

The communication means 54 transmits the observation information 14 and the reliability 55 to the host vehicle 21 via communication as well as acquires the surroundings information 12 and the vehicle information 13 from the host vehicle 21 and passes the surroundings information 12 and the vehicle information 13 to the information integration means 52. As previously mentioned, various methods such as a radio beacon, an optical beacon and a cellular line can be applied to the communication method.

One example of the operations of the observation information integration device and the travel control device according to Example 1 of the present invention will be described using FIGS. 8 to 16. Note that, for convenience of illustration, only the surroundings information detection areas 62 of the camera 22 is drawn herein. Moreover, suppose that the detection information 15 acquired by the observation information integration device 51 is from the fixed point observation camera 61 in this description, but any sensing devices existing on the roadside including another vehicle 71 can be applied in this Example besides the fixed point observation camera 61.

Figure 8:
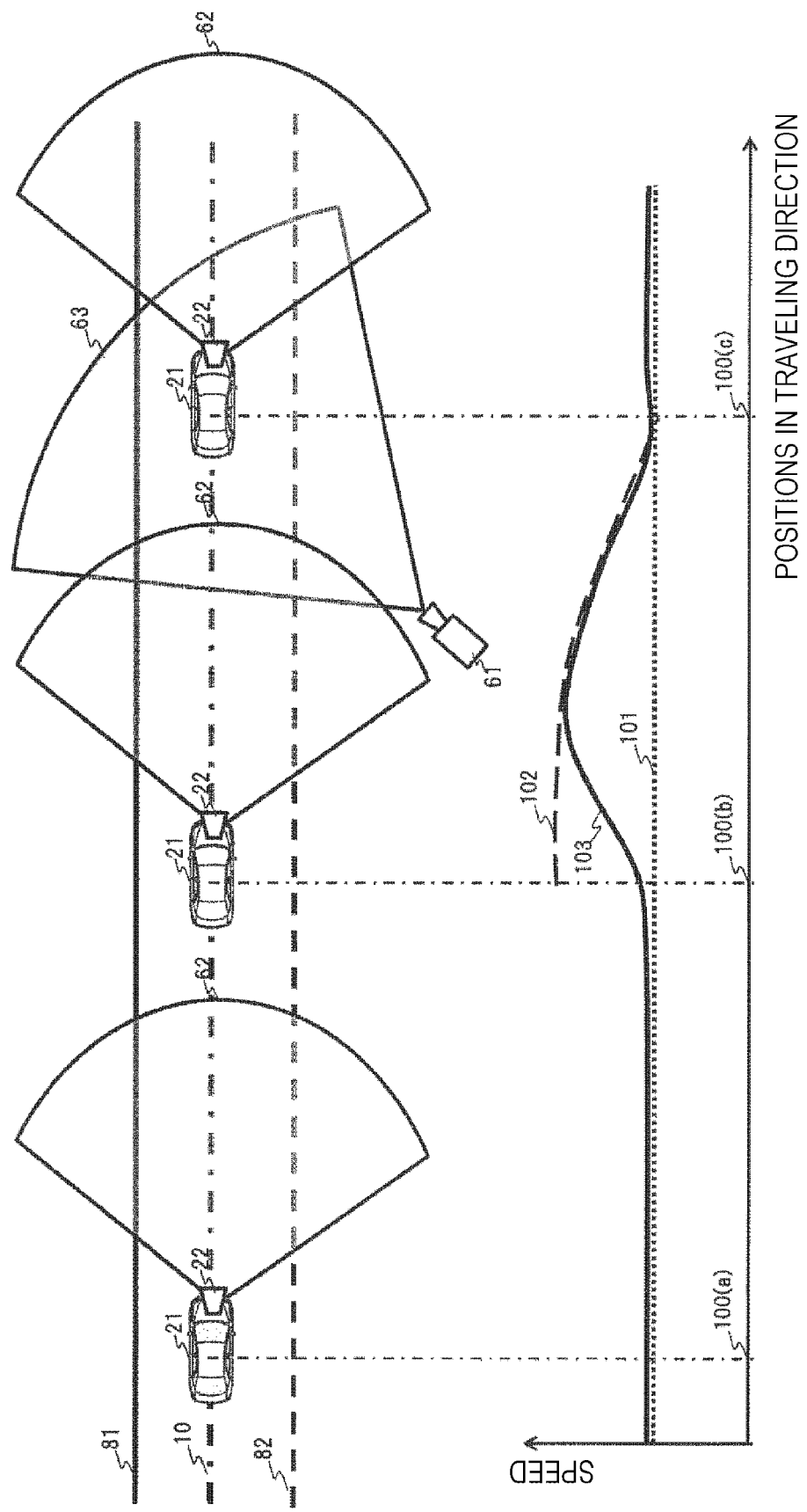
FIG. 8 is an explanatory diagram showing the behavior of the travel control means 7 in the observation information integration device and the travel control device according to Example 1 of the present invention.

FIG. 8 is an explanatory diagram showing one example of a speed change of the host vehicle 21 when the host vehicle 21 travels on a road. Herein, there are road marking paint 81 indicated by the solid line on the left side of the host vehicle and road marking paint 82 indicated by the broken line on the right side of the host vehicle. The travelable area 10 is set as the target travel path of the host vehicle 21 in the middle between the road marking paints 81 and 82 as indicated by the alternate long and short dash line. Herein, the angular fields of the camera 21 attached to the front of the host vehicle 21 are illustrated as the surroundings information detection areas 62. Moreover, one fixed point observation camera 61 is installed on the roadside, and the angular field 63 thereof is also illustrated.

The graph on the lower side of FIG. 8 shows changes of a first speed 101 and a second speed 102, which are calculated inside the travel control means 7, and in an ultimate speed 103 of the host vehicle 21 at each position in the traveling direction. The speed changes of the host vehicle 21 at each position will be described.

First, when the host vehicle 21 is at a position 100(*a*), the surroundings information detection area 62 does not overlap with the angular field 63 of the fixed point observation camera. When there is no specific obstacle around the host vehicle 21, the host vehicle 21 travels at the speed 103 equal to the first speed 101 based on the size of the detection area of the surroundings information 12. Moreover, when an obstacle is detected in the surroundings information detection area 62, the speed is lowered based on the obstacle position.

Next, when the host vehicle 21 is at a position 100(*b*), there is a region where the surroundings information detection area 62 and the angular field 63 of the fixed point observation camera overlap. At this time, the area that can be detected by the host vehicle 21 is the observation information 14 defined as the union of the surroundings information detection area 62 and the angular field 63, and the size of the detectable area, particularly the length of the forward region of the host vehicle 21, is expanded. By expanding the detectable area, the host vehicle 21 can travel at the second speed 102 higher than the first speed 101 without losing safety. However, since a rapid speed change causes a deterioration in riding comfort and the like, after reaching the position 100(*b*), the speed 103 of the host vehicle 21 rises smoothly as shown in the drawing and reaches the second speed 102 over a predetermined time.

From the position 100(*b*) to a position 100(*c*), the region where the surroundings information detection area 62 and the angular field 63 of the fixed point observation camera enlarges as the host vehicle 21 travels, and the area of the observation information 14 is relatively decreased. Therefore, the second speed 102 is gradually lowered, and the ultimate speed 103 decreases accordingly. Then, when the length of the forward region of the observation information 14 becomes equal to the surroundings information detection area 62, the speed 103 becomes equal to the first speed 101 again. Thus, the speed 103 of the host vehicle can be increased as the size of the region of the observation information 14, particularly the length in the forward direction of the host vehicle 21, enlarges.

Figure 9:
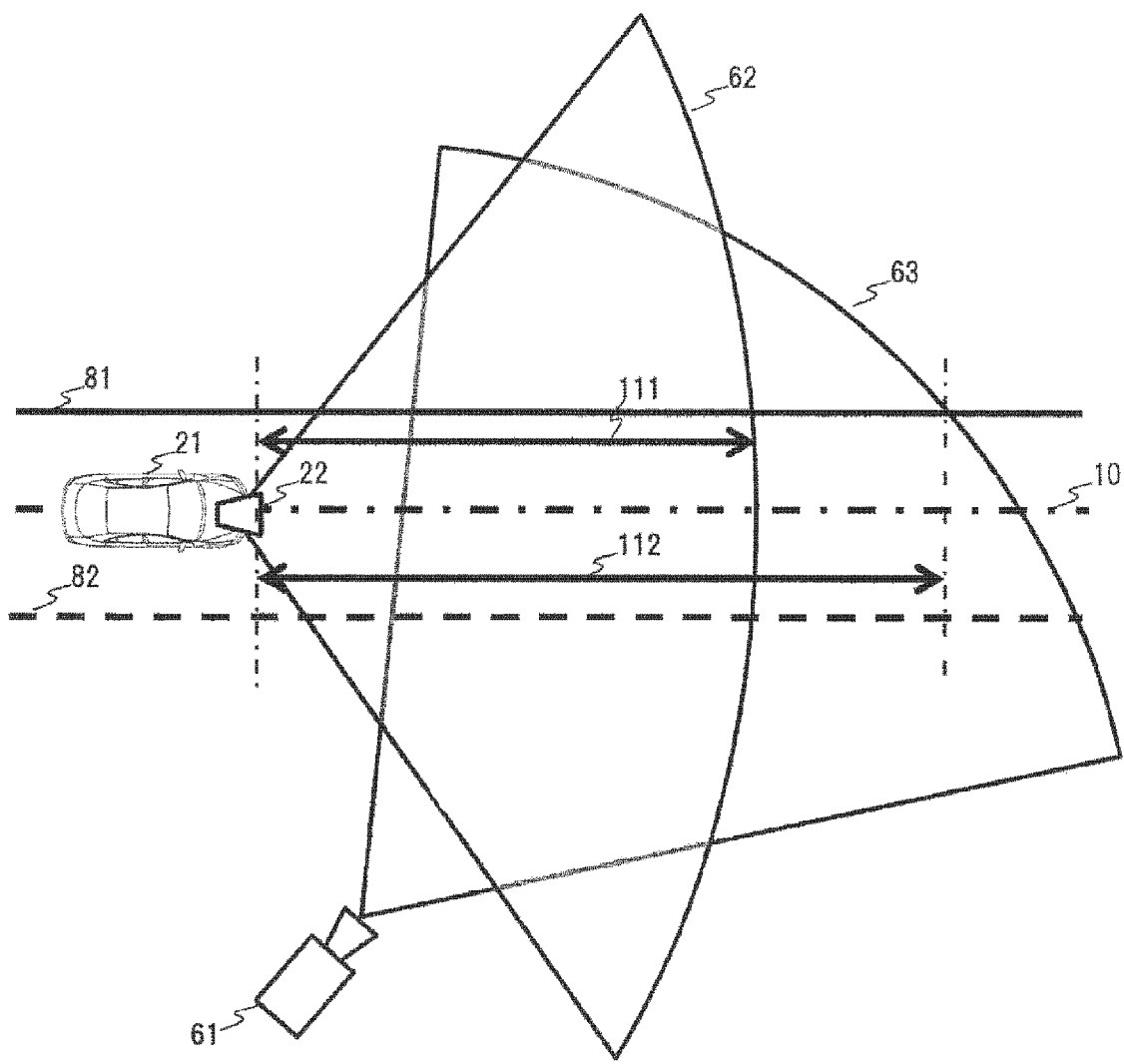
FIG. 9 is an explanatory diagram showing the behavior of the travel control means 7 in the observation information integration device and the travel control device according to Example 1 of the present invention.

Herein, the definition of "the length in the forward direction of the host vehicle 21" will be described using FIG. 9. FIG. 9 shows a case of a positional relationship in which the surroundings information detection area 62 of the host vehicle 21 overlaps with the angular field 63 of the fixed point observation camera 61. At this time, in a case of only the surroundings information detection area 62 of the host vehicle 21, the first speed 101 is calculated based on a distance 111 from the front of the host vehicle to the place where the surroundings information detection area 62 is first interrupted along the traveling direction. Meanwhile, the second speed 102 is similarly calculated based on a traveling direction distance 112 with respect to the observation information 14 which is the union of the surroundings information detection area 62 and the angular field 63. The longer these distances 111 and 112 are, the higher the speeds are. Therefore, in this case, the second speed is higher than the first speed.

Figure 10:
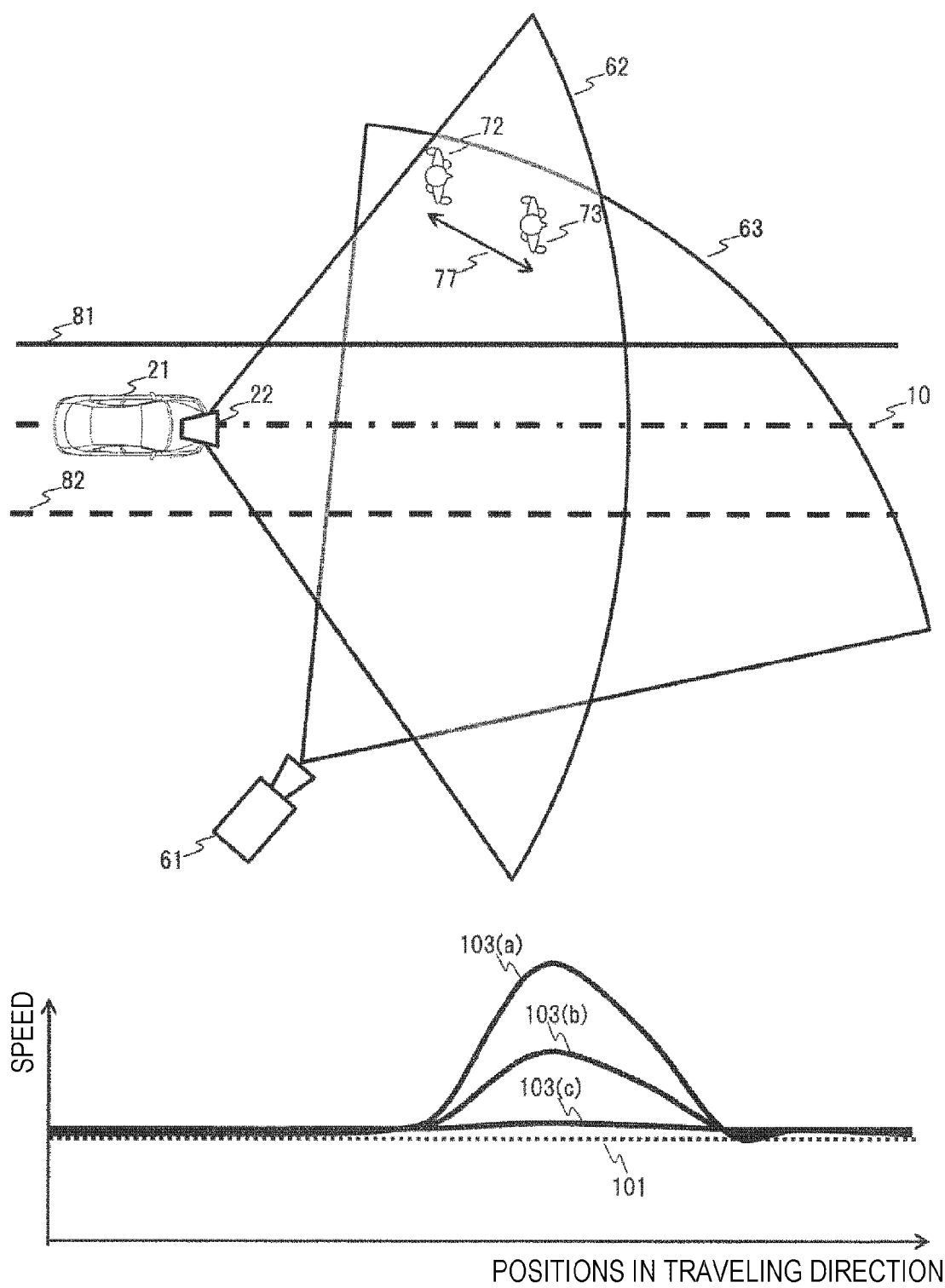
FIG. 10 is an explanatory diagram showing the behavior of the travel control means 7 in the observation information integration device and the travel control device according to Example 1 of the present invention.

FIG. 10 is an explanatory diagram showing the behavior of the travel control means 7 when a deviation occurs between the surroundings information 12 and the detection information 15 by the fixed point observation camera 61, that is, when the reliability 55 is low. The positional relationship between the host vehicle 21 and the fixed point observation camera 61 is the same as that in FIG. 9. At this time, the moving body 72 existing in the surroundings information 12 from the host vehicle 21 and the moving body 73 existing in the detection information 15 from the fixed point observation camera 61 are the same object. However, as a result of the coordinate conversion by the information integration means 52, the deviation 77 occurs at the position as shown in FIG. 10. In this case, as previously mentioned, the reliability calculation means 53 calculates the reliability 55 to be lower as the deviation 77 is greater.

Herein, as one example, the reliability is calculated to be 1 when the deviation is 0, and the reliability is calculated to be 0 when the deviation exceeds a predetermined value (e.g., 3 m). When the deviation has a value therebetween, linear interpolation is performed, that is, the reliability is calculated to be 0.5 when the deviation is 1.5. The change of the speed 103 of the host vehicle 21 at this time is shown in the graph on the lower side of FIG. 10. When the reliability is 1, that is, when the deviation is 0, the speed of the host vehicle 21 becomes higher than the first speed 101 as indicated by 103(a) based on the size of the detection area of the observation information 14. Meanwhile, when the reliability is 0.5, that is, when the deviation is about half a predetermined value, the speed of the host vehicle 21 still becomes higher than the first speed 101 as indicated by 103(b), but the increase amount is less. Then, when the reliability is 0, that is, when the deviation is a predetermined value or more, the speed of the host vehicle 21 coincides with the first speed 101 as indicated by 103(c). Thus, the travel control means 7 changes the speed by using not only the size of the detection area of the observation information 14 but also the reliability of the observation information.

Figure 11:
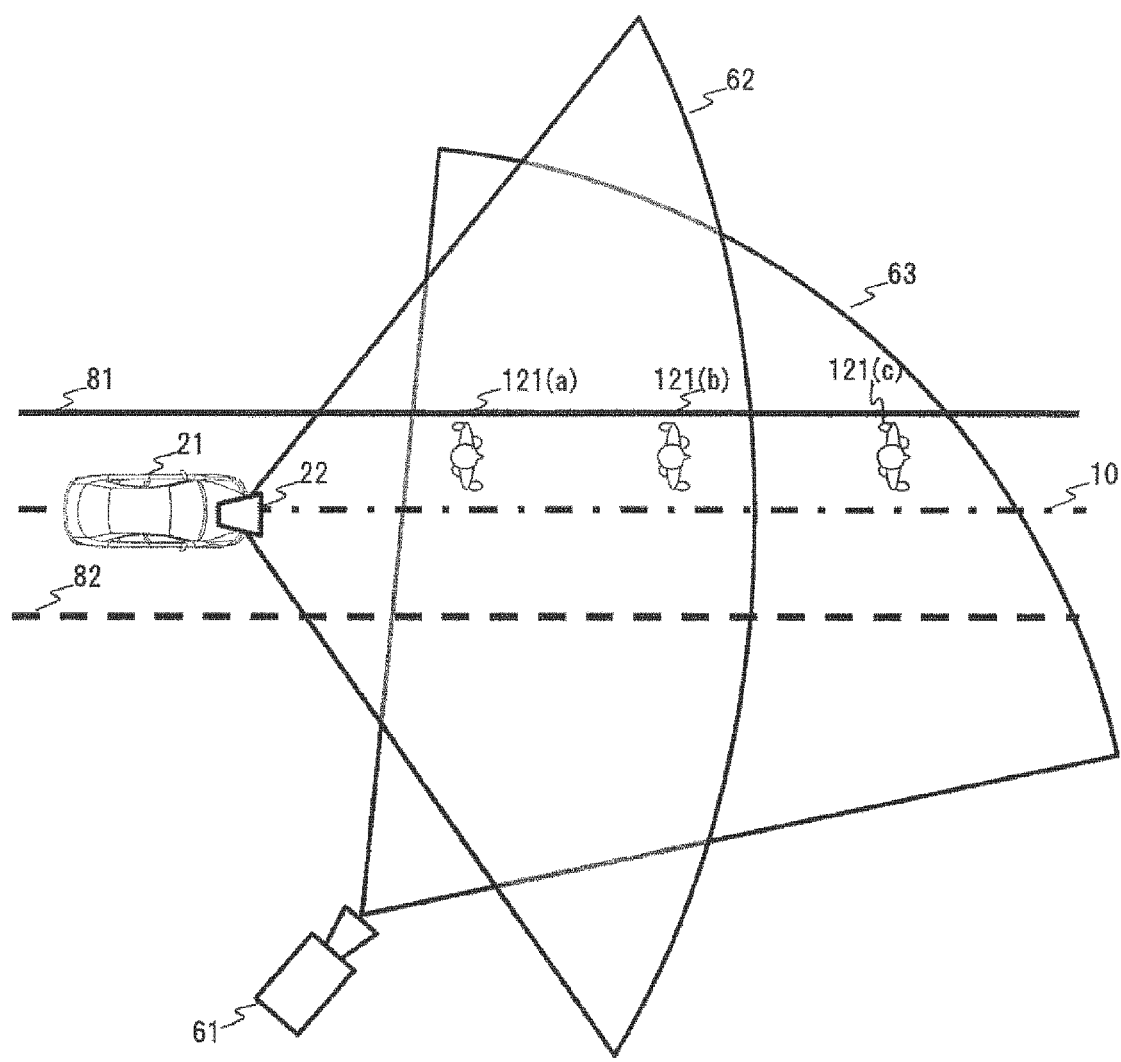
FIG. 11 is an explanatory diagram showing the behavior of the travel control means 7 in the observation information integration device and the travel control device according to Example 1 of the present invention.
Figure 11:
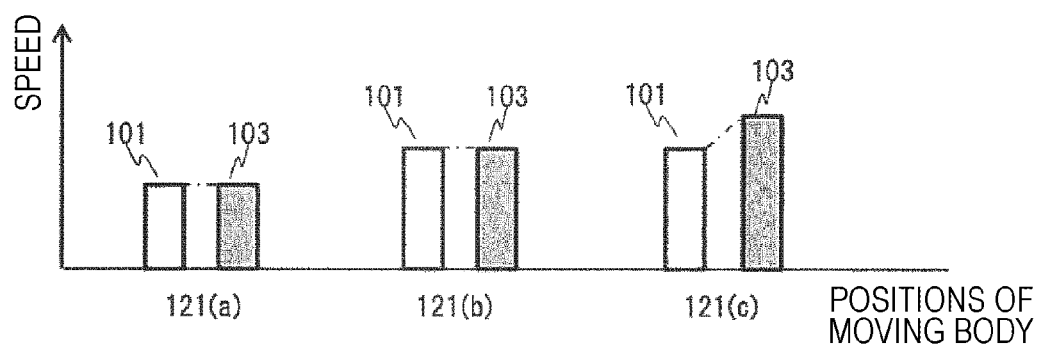

FIG. 11 is an explanatory diagram showing the difference in the speed depending on the position of an object 121 existing ahead of the host vehicle 21. The positional relationship between the host vehicle 21 and the fixed point observation camera 61 is the same as that in FIG. 9. The speeds of the host vehicle 21 are shown in the bar graph on the lower side of FIG. 11 when the respective positions of the moving body 121 are 121(a), 121(b) and 121(c) in the order closer to the host vehicle 21.

First, when the moving body is at 121(a), the first speed 101 and the second speed 102 are equal because the moving body exists in the surroundings information detection area 62. As a result, the vehicle body speed 103 is equal to the first speed 101. Next, when the moving body is at 121(b), the first speed 101 is increased because the distance from the host vehicle 21 to the moving body is greater than that of a case of 121(a). However, since the moving body exists in the surroundings information detection area 62 (almost a boundary region), the first speed 101 and the second speed 102 are equal. As a result, the vehicle body speed 103 is equal to the first speed 101. Furthermore, when the moving body is at 121(c), the moving body exists outside the surroundings information detection area 62. At this time, the travel control means 7 considers the possibility that there is a moving body which cannot be seen in the boundary region of the surroundings information detection area 62. Thus, the first speed 101 is substantially the same as that of the case of 121(b). Meanwhile, since the moving body exists in the angular field 63 of the fixed point observation camera 61 and exists farther from the surroundings information detection area 62, the value of the second speed 102 is calculated to be higher than that of the first speed 101. As a result, the vehicle speed 103 is higher than the first speed 101 and equal to the second speed 102. Thus, the travel control means 7 changes the speed depending on the position of the object existing ahead of the host vehicle.

In the description so far, the case where the travelable range 10 is linear has been described, but the travelable area 10 is not necessarily linear. In this case, the travel control means 7 calculates the speed with respect to an object existing on the region along the travelable area 10.

Figure 12:
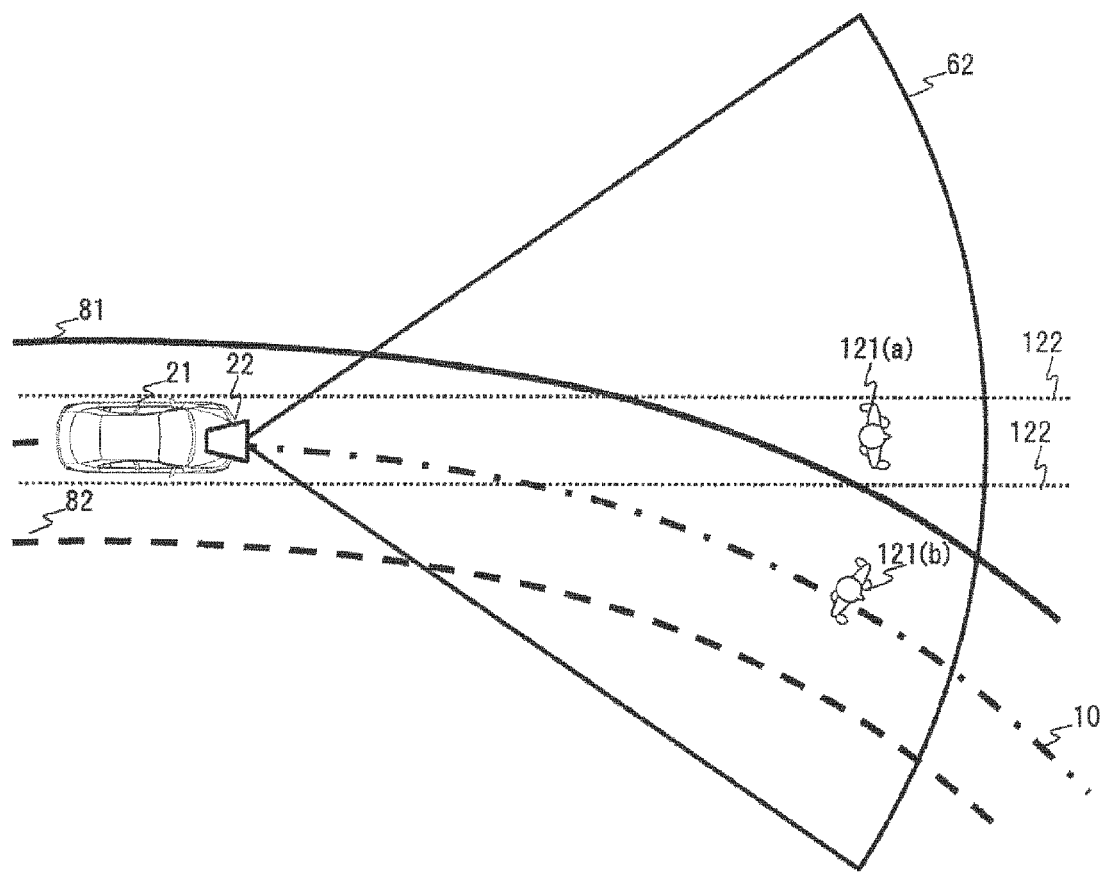
FIG. 12 is an explanatory diagram showing the behavior of the travel control means 7 in the observation information integration device and the travel control device according to Example 1 of the present invention.
Figure 12:
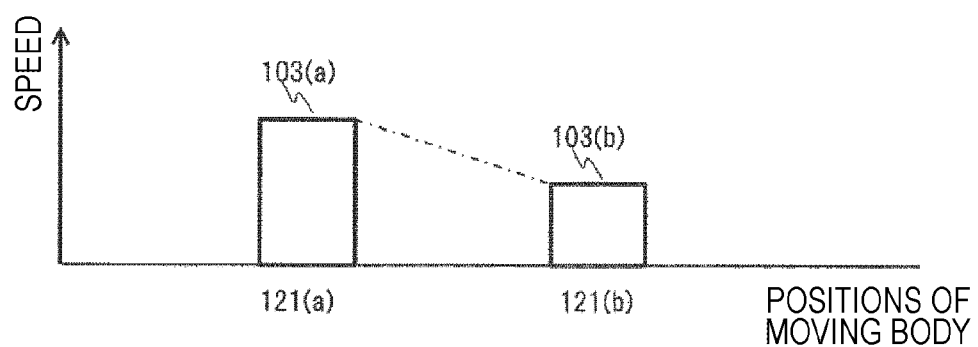

The behavior in a case where the travelable area 10 is curved will be described using FIG. 12. Herein, for the convenience of explanation, only the surroundings information 12 by the camera 22 is illustrated as the observation information 14, and the same applies to a case where the roadside detection information is integrated. Moreover, a region linearly surrounding the forward region of the host vehicle is indicated by broken lines 122. The speeds of the host vehicle 21 are shown in the bar graph on the lower side of FIG. 12 when the respective positions of the moving body 121 are 121(a) and 121(b).

First, when the forward moving body exists at 121(a), the moving body is within the forward region 122 of the host vehicle, but is out of the region along the travelable area 10, that is, the region sandwiched between the road marking paints 81 and 82. In this case, the host vehicle 21 determines that a moving body does not exist in the region along the travelable area 10 and decides the speed 101 based on the distance to the boundary region of the surroundings information detection area 62 along the travelable area 10. Meanwhile, when a forward moving body exists at 121(b), the moving body is out of the forward region 122 of the host vehicle, but exists in the region along the travelable area 10, that is, the region sandwiched between the road marking paints 81 and 82. In this case, the host vehicle 21 calculates the distance to the moving body along the travelable area 10 and decides the speed 101. Therefore, the speed 103 is lower in the case where the moving body is at the position 121(b) than in the case where the moving body is at the position 121(a).

In the description so far, the case where the second speed 102 is equal to or greater than the first speed 101 has been described, but the second speed 102 may be lower than the first speed 101. This will be described using FIG. 13.

Figure 13:
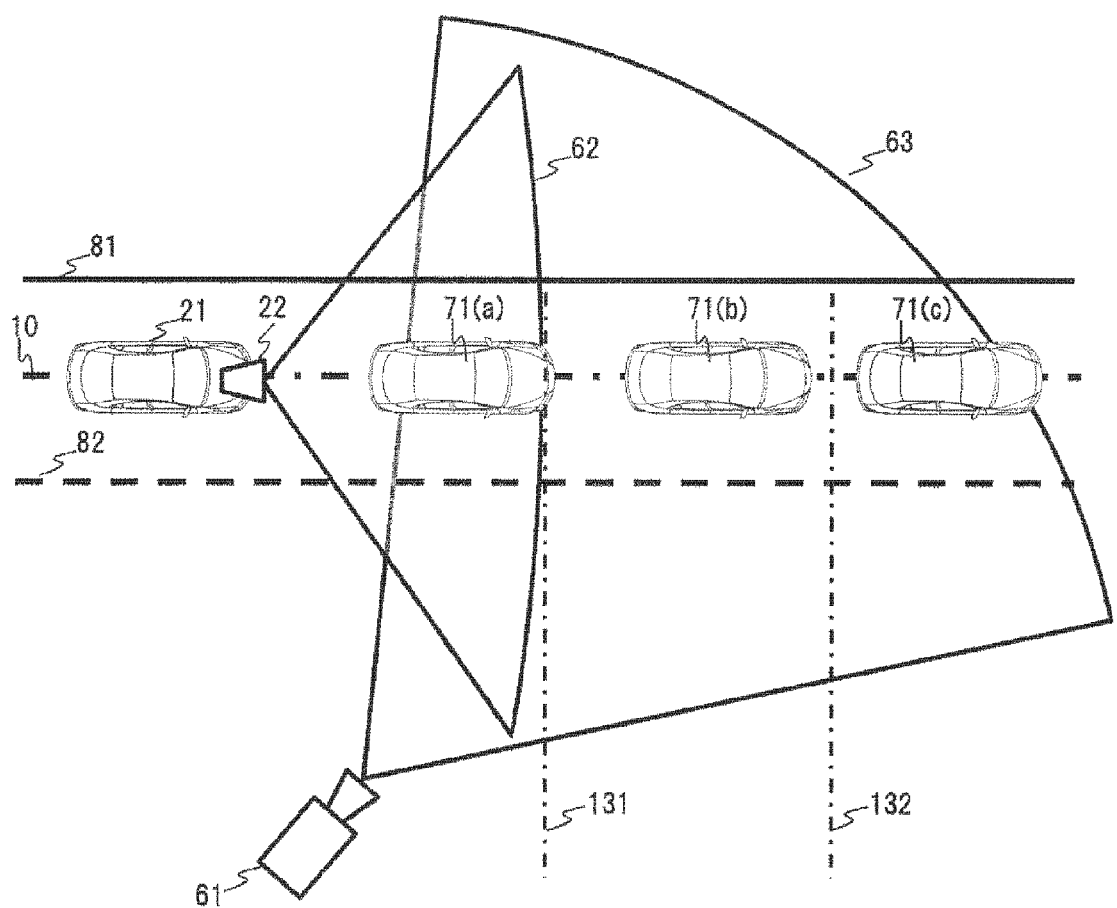
FIG. 13 is an explanatory diagram showing the behavior of the travel control means 7 in the observation information integration device and the travel control device according to Example 1 of the present invention.
Figure 13:
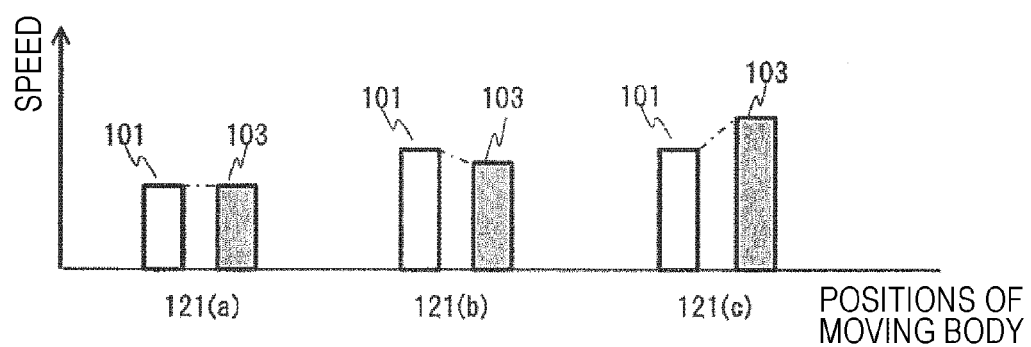

FIG. 13 is an explanatory diagram showing a comparison of the speeds of the host vehicle 21 when another vehicle 71 exists ahead of the host vehicle 21. The positional relationship between the host vehicle 21 and the fixed point observation camera 61 is the same as that in FIG. 9, but for the convenience of explanation, the surroundings information detection area 62 of the camera 22 is drawn to be small. Three positions of another vehicle 71, 71(a), 71(b) and 71(c), are illustrated in the order closer to the host vehicle 21.

First, when another vehicle is at the position 71(a), another vehicle is inside the surroundings information detection area 62. Thus, the first speed 101 and the second speed 102 are equal. Therefore, the speed 103 is also equal to the first speed 101. Next, when another vehicle is farther from a boundary region (an alternate long and short dash line 131) of the surroundings information detection area 62 and before a predetermined distance ahead (an alternate long and short dash line 132), another vehicle is out of the surroundings information detection area 62 so that the host vehicle 21 travels at the first speed 101 which is a speed based on the size of the surroundings information detection area 62. Meanwhile, the fixed point observation camera 61 captures the appearance of another vehicle 71(b), and the position of another vehicle 71(b) is obtained as the observation information 14. In this case, depending on the traveling method of another vehicle 71(b), the second speed 102 becomes lower than the first speed 101, and as a result, the speed 103 becomes lower than the first speed 101 as in the bar graph on the lower side of FIG. 13.

One example of the situation in which the above event occurs is a case where another vehicle 71(b) is stopped at a red light and the situation is clear that the host vehicle 21 will be stopped behind another vehicle 71(b). In this case, there is a possibility that the speed 103 may become lower than the first speed 101 to decelerate by applying the brake lightly at a sufficient distance in consideration of the riding comfort for the occupant.

Furthermore, when another vehicle is at the position 71(c) farther than the predetermined distance ahead (the alternate long and short dash line 132), another vehicle exists sufficiently far away so that the size of the detection area of the observation information 14 exceeds the surroundings information detection area 62. Thus, the second speed 102 becomes higher than the first speed 101. As a result, the speed 103 also becomes higher than the first speed 101. Thus, the speed basically increases as the distance to the obstacle ahead of the host vehicle is farther. However, the relationship may be reversed when the obstacle ahead is farther from the boundary region (the alternate long and short dash line 131) and before the predetermined distance ahead (the alternate long and short dash line 132).

In the description so far, the case where the roadside observation entity is only one fixed point observation camera 61 has been described, but there may be a plurality of roadside observation entities, that is, three or more pieces of positional information on the same object in the observation information 14. In this case, since the deviations of the three pieces of positional information are different from each other, it is necessary to appropriately select which observation information is used for the travel control. Hereinafter, an information selection method will be described using FIGS. 14 and 15.

Figure 14:
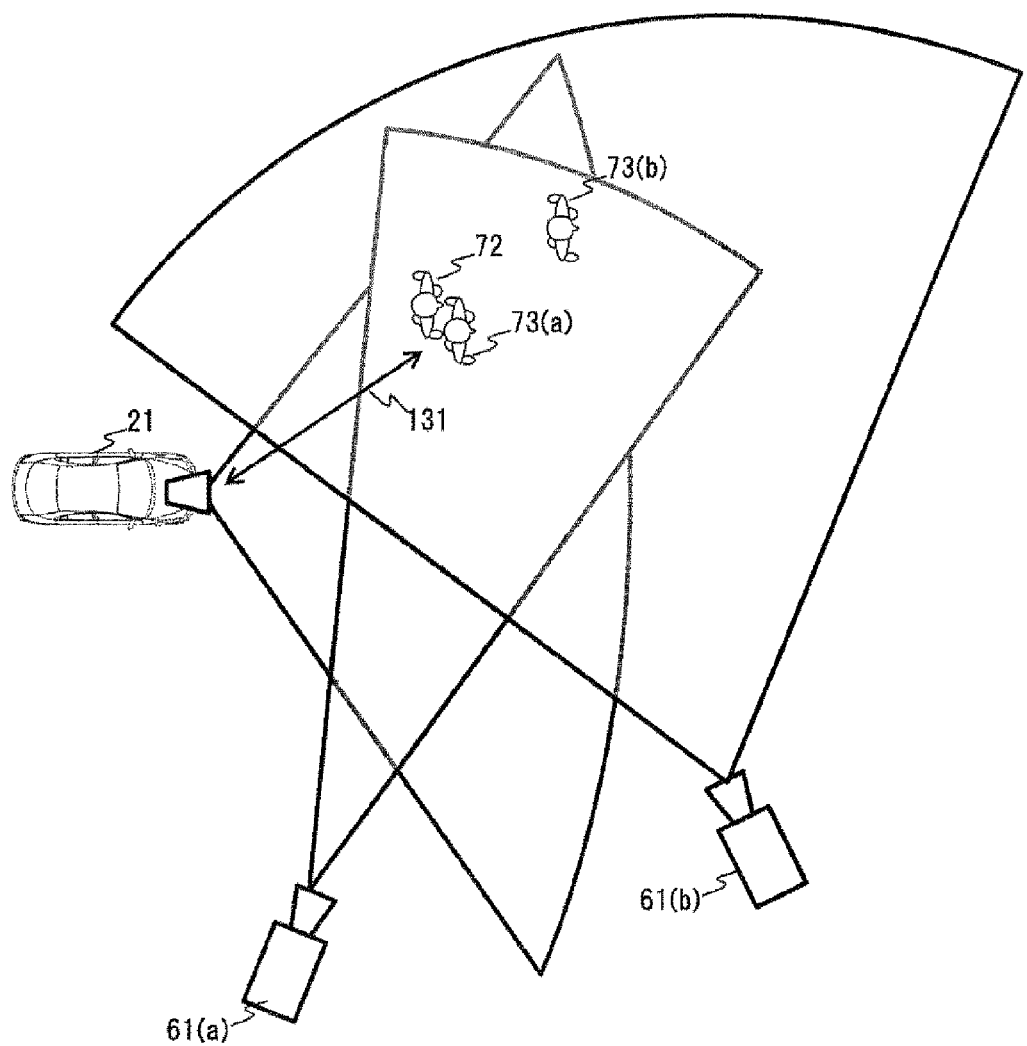
FIG. 14 is an explanatory diagram showing the behavior of the travel control means 7 in the observation information integration device and the travel control device according to Example 1 of the present invention.
Figure 14:
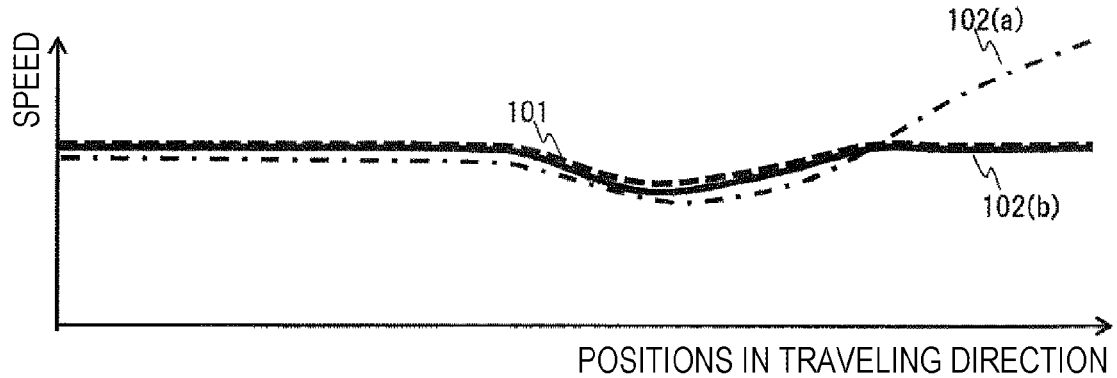

FIG. 14 shows a scene in which one moving body exists ahead of the host vehicle 21, and the position thereof is detected by a total of three observation entities, the camera 22 and two fixed point observation cameras 61(a) and 61(b). In this scene, when the positions of the moving body by the three observation entities substantially coincide, the area of the observation information 14 is the union of the areas of the host vehicle 21, the fixed point observation camera 61(a) and the fixed point observation camera 61(b), and the speed after passing the vicinity of the moving body increases as indicated by an alternate long and short dash line 102(a). However, as shown in FIG. 14, although a moving body 72 detected by the camera 22 of the host vehicle 21 and a moving body 73(a) detected by the fixed point observation camera 61(a) are detected at substantially the same place, a moving body 73(b) detected by the fixed point observation camera 61(b) has a deviation from the detection results of the other two observation entities. In this case, since the positional information on the moving body 73(b) can be regarded as inaccurate, the speed 103 of the host vehicle 21 is decided based on the positions of the moving bodies 72 and 73(a) without using the detection information from the fixed point observation camera 61(b). As a result, as shown in the graph of the speed change shown on the lower side of FIG. 14, the first speed and the second speed are reduced in substantially the same manner when passing the vicinity of the moving body 72. Moreover, the detection information from the fixed point observation camera 61(b) is not used. Thus, the region of the observation information is reduced, and the first speed and the second speed continue to coincide even after passing the vicinity of the moving body.

Figure 15:
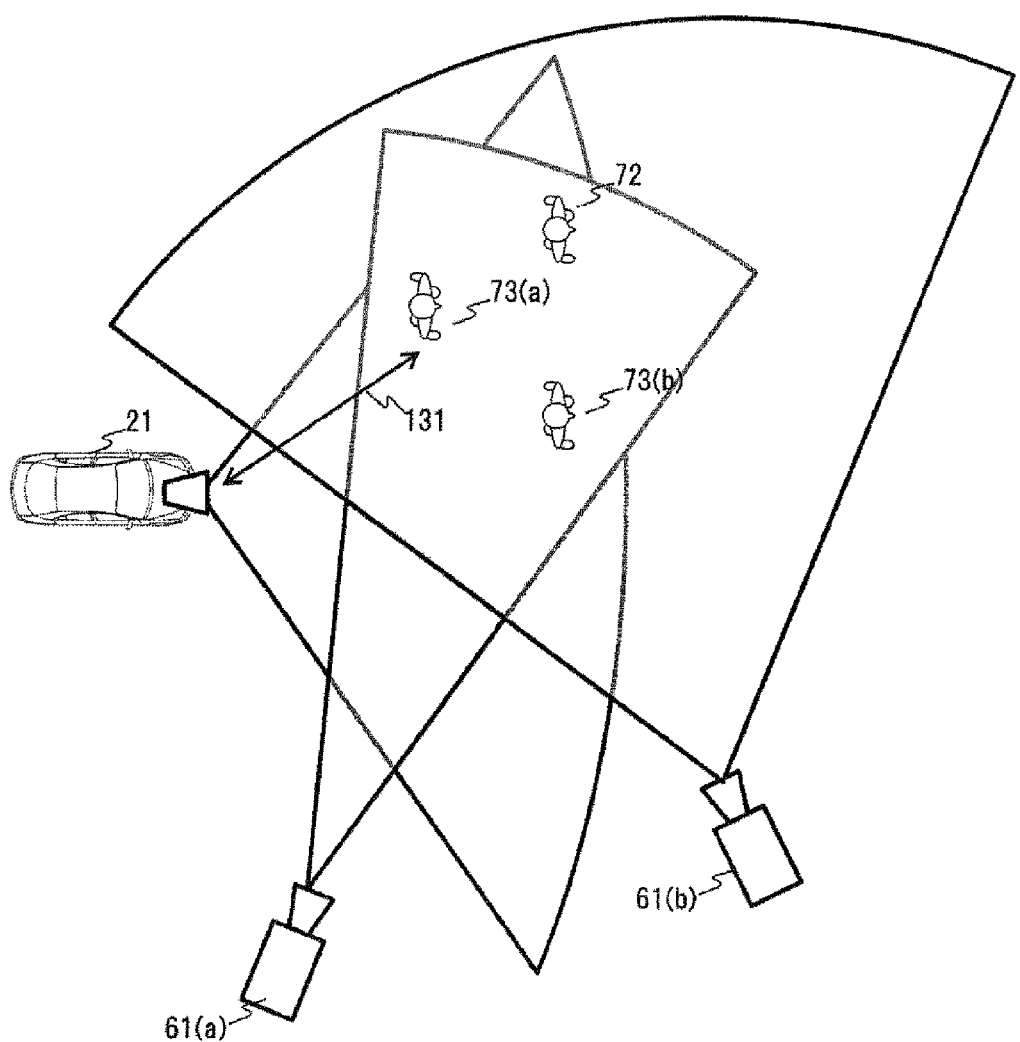
FIG. 15 is an explanatory diagram showing the behavior of the travel control means 7 in the observation information integration device and the travel control device according to Example 1 of the present invention.
Figure 15:
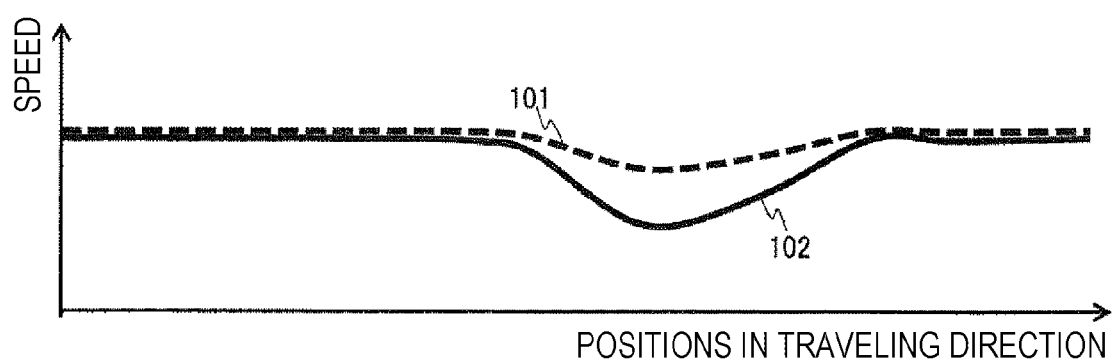

FIG. 15 shows a case where all the moving bodies 72, 73(a) and 73(b) detected by the three observation entities are detected at different positions in the same scene as in FIG. 14. In this case, since there is always a deviation between any two pieces of observation information, the travel control means 7 sets the second speed to a speed substantially equal to the first speed. At this time, in order to further ensure safety and a sense of security for the occupant, a moving body (73(a) in this case) detected at a place closest to the host vehicle 21 may be set as a moving body to be avoided. In FIG. 15, the moving body 73(a) is the moving body closest to the host vehicle 21 and exists at a position closer the host vehicle 21 than the moving body 72 detected by the surroundings information 12. In this case, as shown in the speed graph on the lower side of FIG. 15, the speed 102 for the moving body 73(a) becomes lower than the first speed 101 for the moving body 72. As a result, the speed of the host vehicle 21 is further dropped.

Thus, according to the observation information integration device 51 and the travel control device 1 of Example 1, the detection information from the plurality of observation entities including the host vehicle is integrated so that an object in a region out of the surroundings information detection area 62 of the host vehicle can be detected. As a result, it is possible to increase the speed and enhance vehicle utility in automated driving while ensuring safety compared with a case where only the surroundings information is used. Moreover, by calculating the reliability 55 based on the deviation between the surroundings information 12 and the observation information 14 and appropriately deciding the speed increase amount based on the reliability 55, it is possible to provide the travel control device that realizes appropriate speed control ensuring both safety and vehicle utility even in a case where the detection accuracy of the roadside observation entity is low.

Note that the case where the observation information integration device 51 exists on the roadside has been described in the above description, but the observation information integration device 51 may be mounted inside the host vehicle 21 and configured to receive the observation information from the fixed point observation camera 61 and another vehicle 71 via the communication device 43. In this case, the observation information integration device 51 has, for example, a CPU, a ROM, a RAM and an input/output device, like the travel control device 1. The aforementioned observation information integration algorithm is stored in the ROM. This algorithm is computed using the CPU and the RAM, and the computation result is transmitted to the travel control device 1 via a communication network inside the vehicle.

Example 2

Next, Example 2, which is one example of the present invention, will be described using FIG. 16. Note that the contents the same as those of Example 1 are omitted.

In Example 1, the contents of configuring the observation information integration device 51 and the travel control device 1 as separate devices have been described. However, in practice, the observation information integration device 51 cannot always be installed on the roadside. Therefore, the travel control device 1 may directly acquire the detection information from the roadside observation entity, and the travel control means 7 may be configured to realize the same function as the observation information integration device 51 in Example 1.

Figure 16:
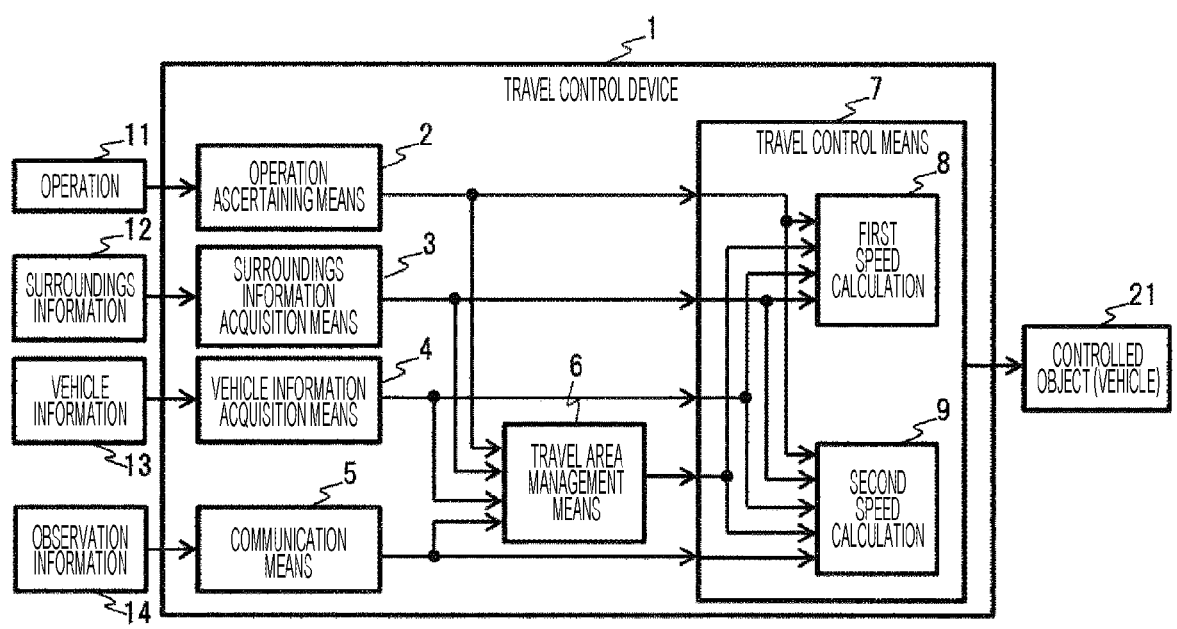
FIG. 16 is a block diagram showing the configuration of a travel control device according to Example 2 of the present invention.

FIG. 16 is a block diagram showing a partial configuration of a travel control device according to Example 2 of the present invention. In Example 2 shown in FIG. 16, a travel control device 1 includes at least an operation ascertaining means 2, a surroundings information acquisition means 3, a vehicle information acquisition means 4, a communication means 5, a travel area management means 6 and a travel control means 7. The configurations and operations of the operation ascertaining means 2, the surroundings information acquisition means 3, the vehicle information acquisition means 4 and the travel area management means 6 are the same as those in Example 1 so that the descriptions thereof are omitted.

The communication means 5 acquires observation information 14 from roadside observation entities such as a fixed point observation camera 61 and another vehicle 71 via a communication device 43 and stores the observation information 14 in a storage device in the travel control device. Although not clearly shown in the drawing, the observation information may be acquired from a plurality of observation entities herein as in the case of detection information 15. At least the moving bodies 72 and 73, the road marking paint 74, sign information (not shown) and the like detected around the host vehicle are transmitted and received as the surroundings information 12 and the observation information 14. For a communication method, a communication system dedicated to road-to-vehicle communication (a radio beacon, an optical beacon, or the like), a cellular line (a 4G line), or the like is used.

The travel control means 7 computes a travel plan by using at least one of operation 11, the surroundings information 12, vehicle information 13, the observation information 14 or a travelable area 10 and decides the operation of a vehicle 21 based on the travel plan. Then, a control command value for each actuator mounted on the vehicle 21 is calculated so as to realize the operation. The travel control means 7 is further provided with a first speed calculation unit 8 and a second speed calculation unit 9. These functions are the same as those in Example 1.

The travel control means 7 bears the function of the observation information integration device 51 in Example 1. That is, the observation information 14 acquired from one or a plurality of observation entities by the communication means 5 is stored in a storage device (a ROM, a RAM or the like (not shown)) in the travel control device. Then, the positions and orientations of objects, including moving bodies, road marking paint, signs (not shown) and the like, from the stored surroundings information 12, vehicle information 13 and the observation information 14 are converted into the same coordinate system. The observation information on the same object acquired from the plurality of observation entities is integrated. The contents of these specific behaviors are the same as those described in Example 1 using FIGS. 5 and 6 so that the descriptions thereof are omitted.

Example 1 and Example 2 have different device configurations, but the specific behavior of a vehicle on which the invention of Example 2 is mounted is the same as that described in Example 1 using FIGS. 7 to 15 so that the description thereof is omitted.

Thus, according to the travel control device 1 of Example 2, the travel control device 1 collects the observation information from one or a plurality of observation entities existing on the roadside at a place where the observation information integration device 51 is not installed, and the observation information is integrated inside the travel control device 1 so that an object in a region out of a surroundings information detection area 62 of the host vehicle can be detected as in Example 1. As a result, it is possible to provide a travel control device that realizes the same effects as those of Example 1.

Example 3

Next, Example 3, which is one example of the present invention, will be described using FIGS. 17 to 20. Note that the contents the same as those of Example 1 or Example 2 are omitted.

In Examples 1 and 2, when the deviation occurs between the surroundings information 12 and the observation information 14, the increase in the second speed is suppressed. This is a means for determining that an error has occurred in the observation information 14 because the observation information 14 is not necessarily accurate. However, in view of vehicle utility as a travel control device, it is desirable to make the second speed higher than the first speed at more places by utilizing the observation information 14 as much as possible. Therefore, the deviation occurred between the surroundings information 12 and the observation information 14 may be stored in association with the place, and the deviation may be reduced by correcting the information in the observation information 14 to realize the increase in the second speed when the deviation appears in a constant manner.

Figure 17:
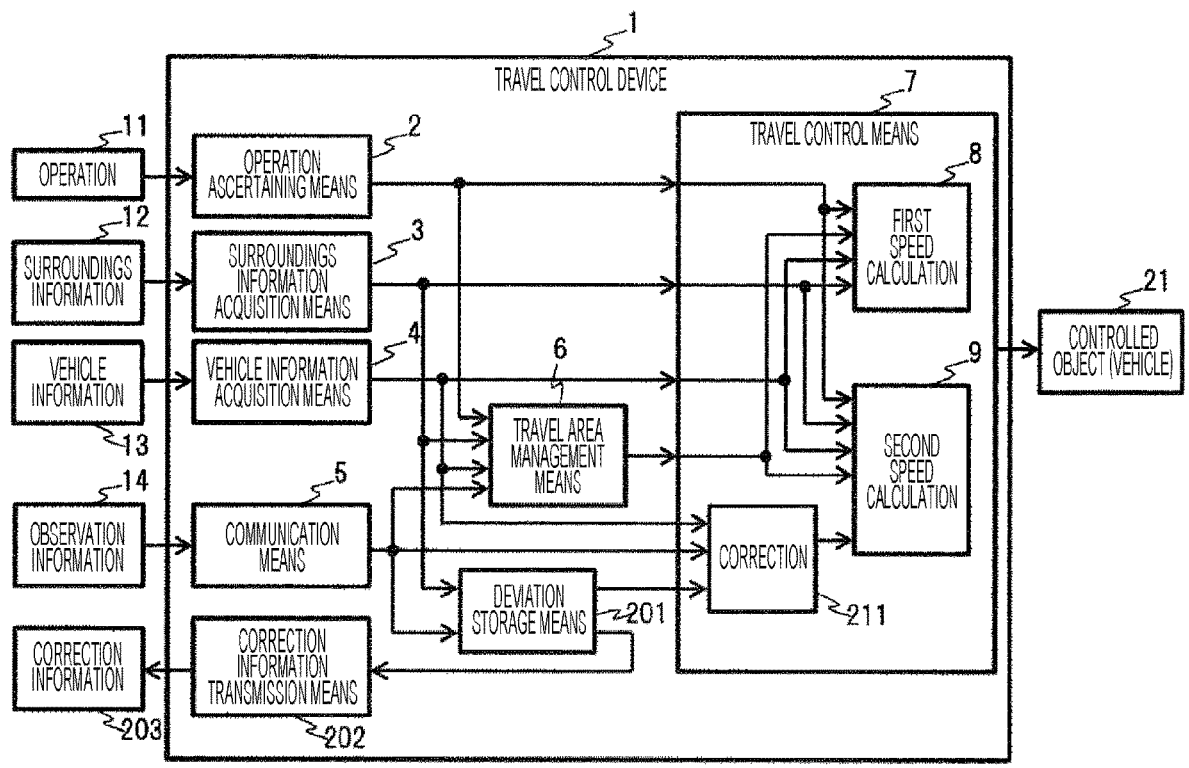
FIG. 17 is a block diagram showing the configuration of a travel control device according to Example 3 of the present invention.
Figure 18:
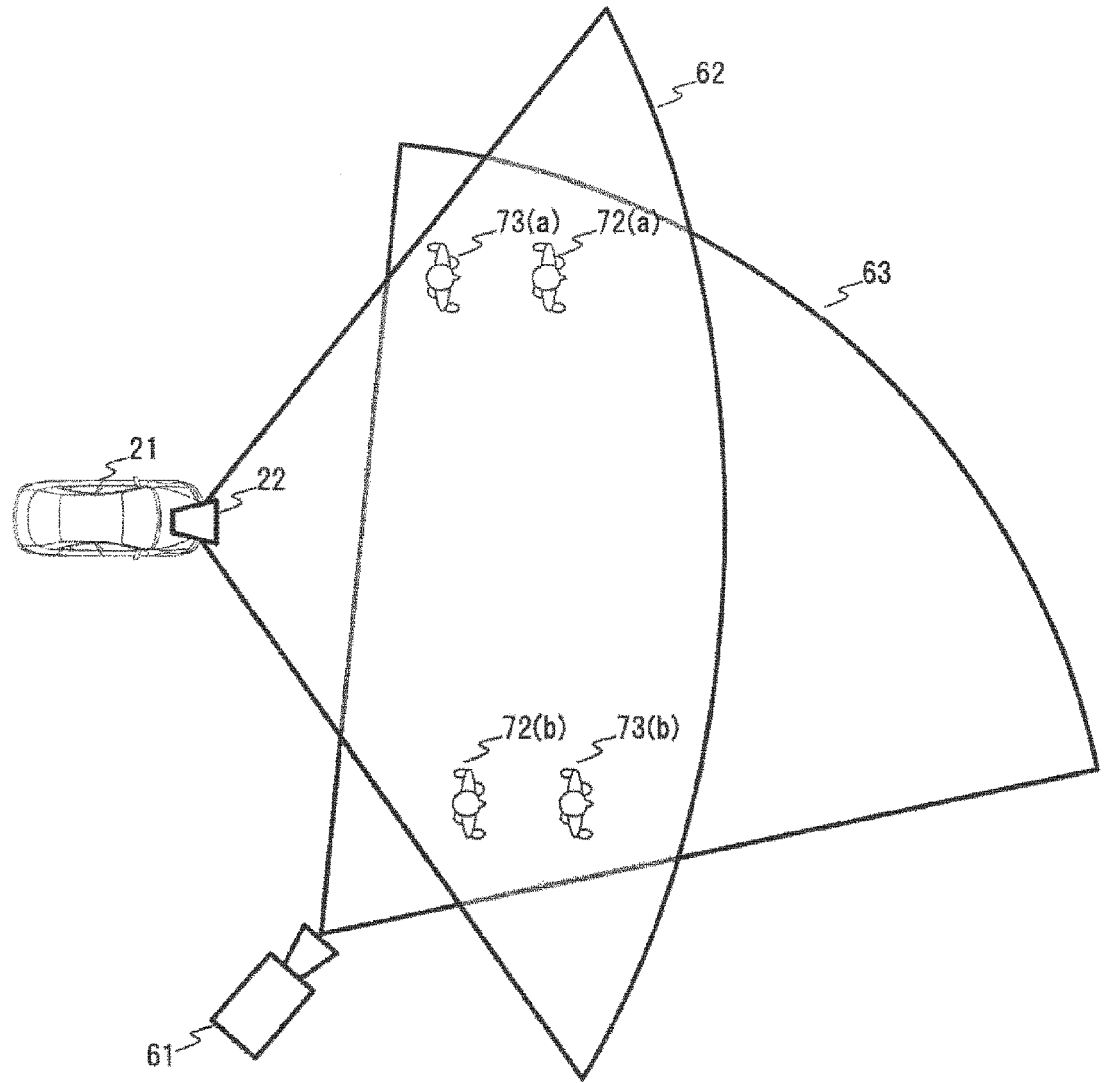
FIG. 18 is an explanatory diagram showing the behavior of the travel control device according to Example 3 of the present invention.
Figure 18:
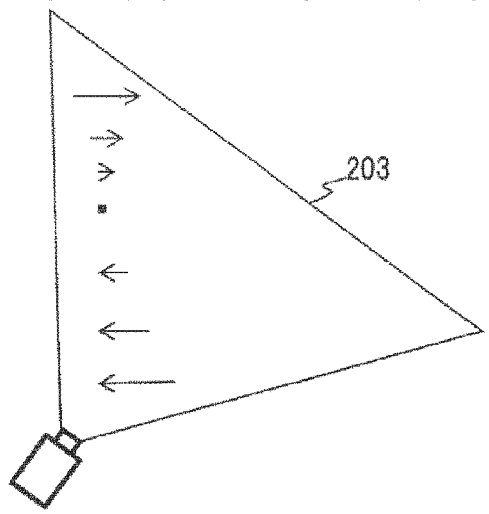

FIG. 17 is a block diagram showing a partial configuration of a travel control device according to Example 3 of the present invention. In Example 3 shown in FIG. 17, as in Example 2, a traveling control means 7 bears the function of the observation information integration device 51 in Example 1. A travel control device 1 includes at least an operation ascertaining means 2, a surroundings information acquisition means 3, a vehicle information acquisition means 4, a communication means 5, a travel area management means 6, a travel control means 7 and a deviation storage means 201. As the details will be described later, a correction information transmission means 202 may also be provided. The configurations and operations of the operation ascertaining means 2, the surroundings information acquisition means 3, the vehicle information acquisition means 4, the communication means 5 and the travel area management means 6 are the same as those in Example 2 so that the descriptions thereof are omitted.

The deviation storage means 201 stores the deviation between surroundings information 12 and observation information 14 in association with the position. One example of the behavior of the deviation storage means 201 will be described using FIGS. 18 and 19.

FIG. 18(A) is an explanatory diagram showing a case where both objects 72 and 73, which are the same, are detected at the place where the detection areas of a camera 22 of a host vehicle 21 and a fixed point observation camera 61 overlap. Herein, the object was detected at this place twice in the past. For the first time, the object was detected at places of 72(a) and 73(a) (on the left road side as viewed from the host vehicle 21). For the second time, the object was detected at places of 72(b) and 73(b) (on the right road side as viewed from the host vehicle 21). At each of the places, a deviation occurs between the surroundings information 12 and the observation information 14. On the left road side as viewed from the host vehicle 21, a moving body 73(a) detected by the fixed point observation camera 61 is deviated closer to the host vehicle from a moving body 72(a) detected by the camera 22. Meanwhile, on the left side road as viewed from the host vehicle 21, a moving body 73(b) is reversely deviated farther from the host vehicle 21.

FIG. 18(B) shows correction information 203 stored in the deviation storage means 201 in the situation as shown in FIG. 18(A). This drawing schematically displays correction information on the detection area of the fixed point observation camera by arrows indicating the deviation direction and the deviation amount for the respective places. That is, the detected position of the object detected closer to the fixed point observation camera 61 is corrected in the left direction as viewed from the camera. Meanwhile, the correction is made in the right direction at the farther left place. Such correction information is stored in a storage device in the travel control device. Note that the information actually stored in the storage device in the travel control device is a data set of the places, the deviation directions and the deviation amounts.

Figure 19:
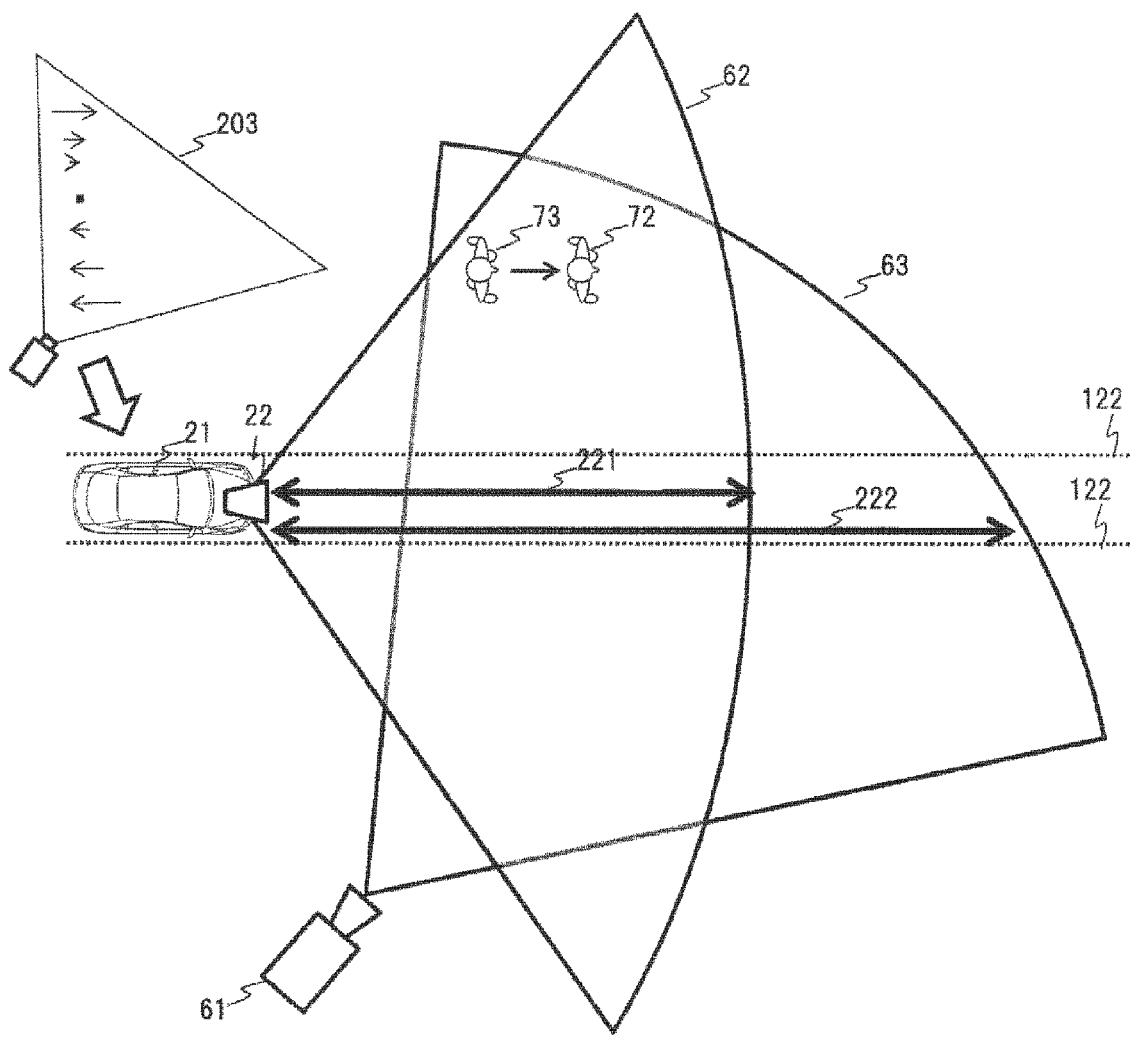
FIG. 19 is an explanatory diagram showing the behavior of the travel control device according to Example 3 of the present invention.
Figure 19:
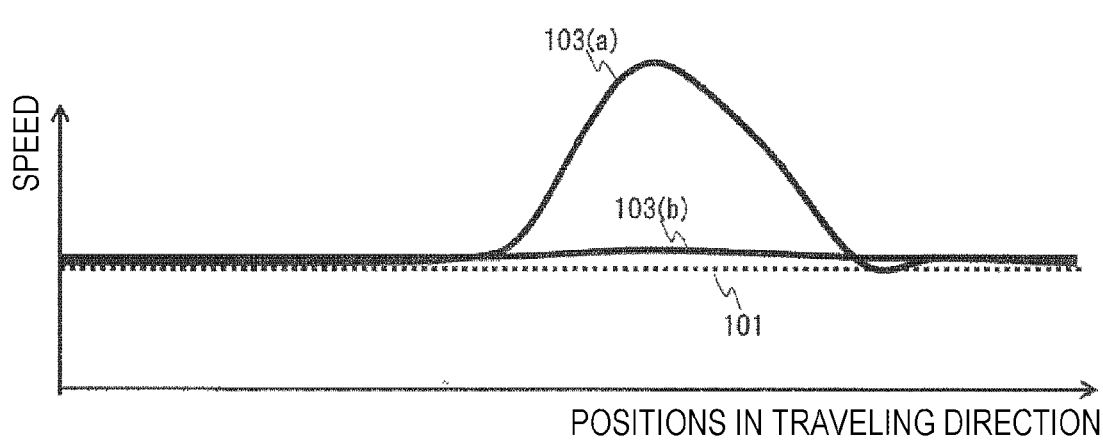

FIG. 19 is an explanatory diagram showing how the observation information from the fixed point observation camera 61 is corrected based on the stored correction information 203 when the vehicle travels the place for the next time. The storage device in the travel control device 1 stores the correction information described with FIG. 18(B). Now, the place where the correction information is associated is reached, and the camera 22 and the fixed point observation camera 61 detect the moving bodies 72 and 73, respectively. At this time, the observation information from the fixed point observation camera 61 is corrected by a correction unit 211 in the travel control means 7. Specifically, the moving body 73 is detected at the farther left in an angular field 3 of the fixed point observation camera 61, and the correction unit 221 corrects, based on the correction information 203, the place of the moving body 73 at this place to the right side as viewed from the fixed point observation camera 61, that is, to the farther side as viewed from the host vehicle 21. As a result, in this case, the moving body 73 has been substantially positioned at the position 72 detected by the camera 22.

In the above situation, referring to the speed graph shown on the lower side of FIG. 19, the speed of the host vehicle substantially coincides with a first speed 101 as a speed 103(b) in the state before the correction. This is because the deviation occurs between the surroundings information 12 and the observation information 14 so that the increase amount is suppressed. On the other hand, the speed increases as indicated by a speed 103(a) after the correction. This is because the distance from the host vehicle to the detection area limit is longer in an observation information detection area 222 than in a surroundings information detection area 221, and the deviation between the surroundings information 12 and the observation information 14 is reduced by the correction so that the second speed became higher than the first speed.

In the description so far, the correction information 203 is generated on the premise that the observation information from the roadside observation entity has substantially the same deviation every time. However, the roadside observation information does not always have substantially the same error. Depending on the time or the type of the object, there is a possibility that how the error occurs changes. Therefore, the travel control means 7 may be configured to calculate the variation of the correction information 203 for the past observation information and calculate the speed using only the observation information with a small variation.

Figure 20:
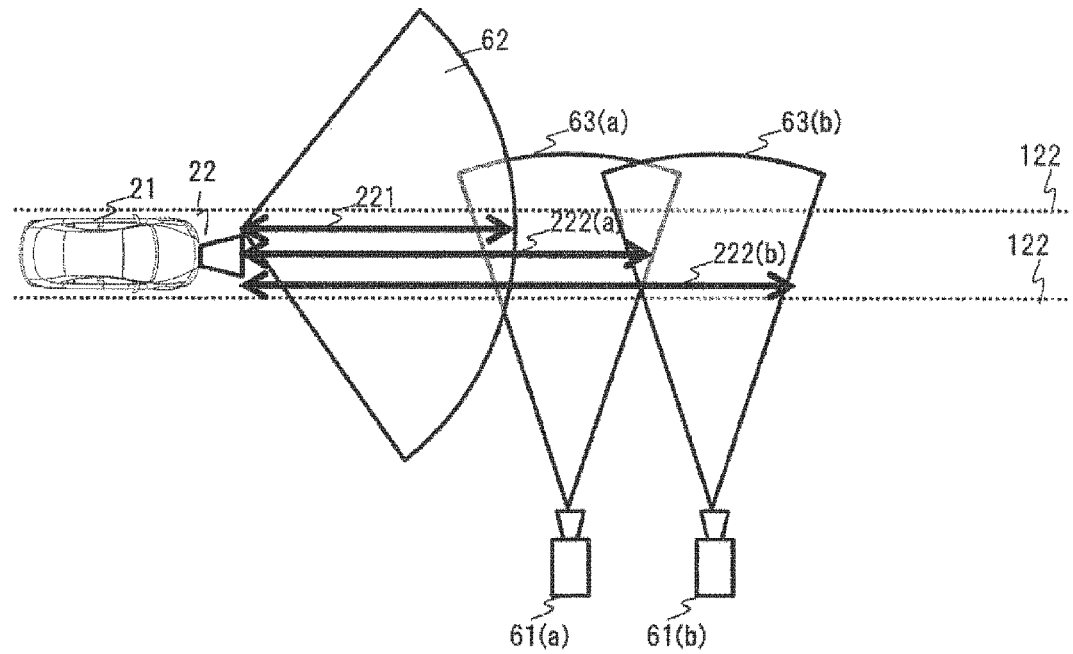
FIG. 20 is an explanatory diagram showing the behavior of the travel control device according to Example 3 of the present invention.
Figure 20:
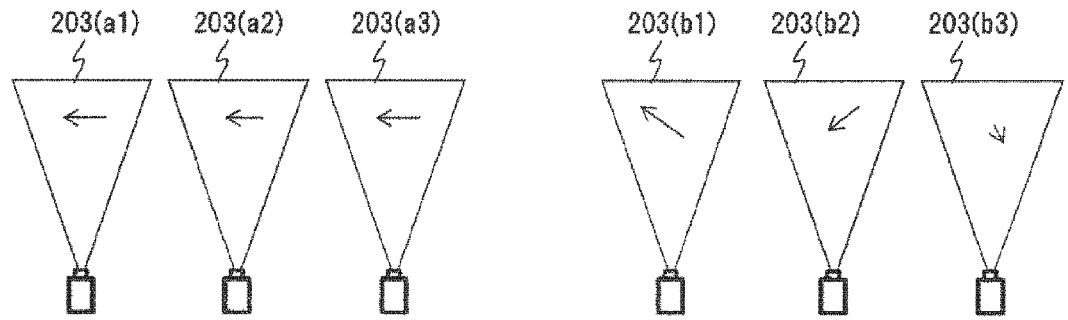
Figure 20:
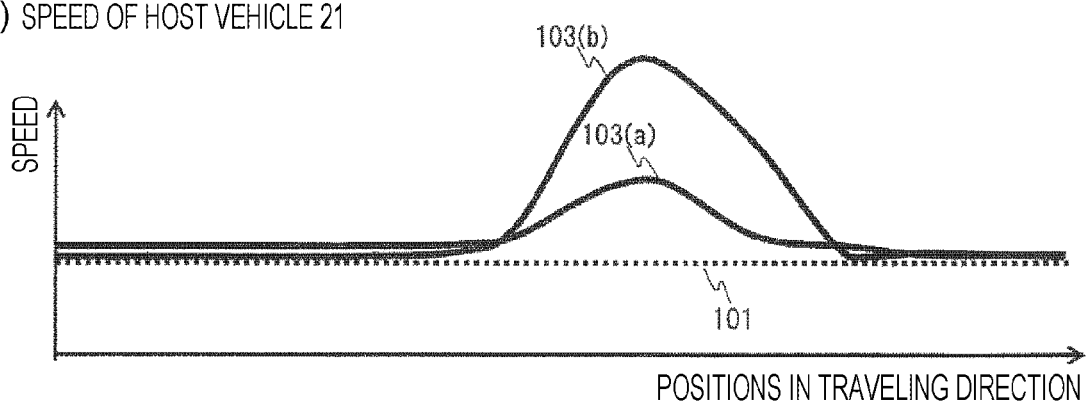

One example of selecting observation information with a small variation will be described using FIG. 20. FIG. 20(A) shows a scene in which two fixed point observation cameras 61(a) and 61(b) are installed at certain places, and the host vehicle 21 travels in the relevant locations. At this time, a surroundings information detection area 62 of the host vehicle 21 and angular fields 63(a) and 63(b) of the respective fixed point observation cameras have overlapping regions. With the union, three detection areas are integrated in a scheduled travel region 122 of the host vehicle 21, and the distant area can be seen. Herein, suppose this place has been passed three times in the past, and this time is the fourth time of passing.

FIG. 20(B) shows one example of the past three pieces of correction information 203 for each fixed point observation camera. In this drawing, 203(a1) to 203(a3) represent the past three pieces of correction information for the fixed point observation camera 61(a), and 203(b1) to 203(b3) represent the past three pieces of correction information for the fixed point observation camera 61(b). An arrow in the correction information 203 indicates the direction for correcting the observation information in a portion overlapping with the scheduled travel region 122 of the host vehicle 21. In terms of the directions of the arrows, it can be seen that the fixed point observation camera 61(a) was corrected to the same extent in the left direction as viewed from the camera in the past three times. Meanwhile, the fixed point observation camera 61(b) varies in the correction direction and the correction amount in each of the past three times.

In the above situation, the transition of the speeds calculated by the travel control means 7 is shown in the graph of FIG. 20(C). The distance 222(b) from the host vehicle to the detection area obtained by integrating the observation information is longer than the distance 221 from the host vehicle to the limit of the surroundings information detection area. Therefore, if there is no deviation between the surroundings information and the observation information, the second speed 102 becomes higher than the first speed 101. As a result, the speed also increases as indicated by 103(b). At this time, since the deviation of the fixed point observation camera 61(a) is constant, the observation information 14 is corrected by using the correction information 203(a1) to 203(a3). At this time, the correction may be performed based on the average of the correction information in the past several times, or the correction may be performed based on the latest correction information 203(a3). Meanwhile, since the deviation of the fixed point observation camera 61(b) varies, the speed control means 7 calculates the second speed without using this information. That is, the distance to the detection area obtained by integrating the observation information becomes short as indicated by 222(a). As a result, the increase amount from the first speed 101 decreases as indicated by the speed 103(a).

The correction information transmission means 202 transmits the correction information 203 stored in the deviation storage means 201 to the observation entities, the manager, and the like. This enables the manager or the like of the observation entities to grasp the calibration shift or failure of the roadside observation entities. It is also possible to share the correction information 203 with other vehicles that use the observation information.

In the description so far, the deviation between the surroundings information 12 and the observation information 14 detected in the past is stored, and the correction information is generated based on the deviation. However, if the correction information can be acquired directly from the roadside observation entities, the correction unit 211 of the travel control means 7 can make corrections by directly utilizing this correction information 203, and the correction information 203 may be directly acquired using communication or the like. In this case, the configuration of the travel control device 1 is as shown in a block diagram in FIG. 21.

Figure 21:
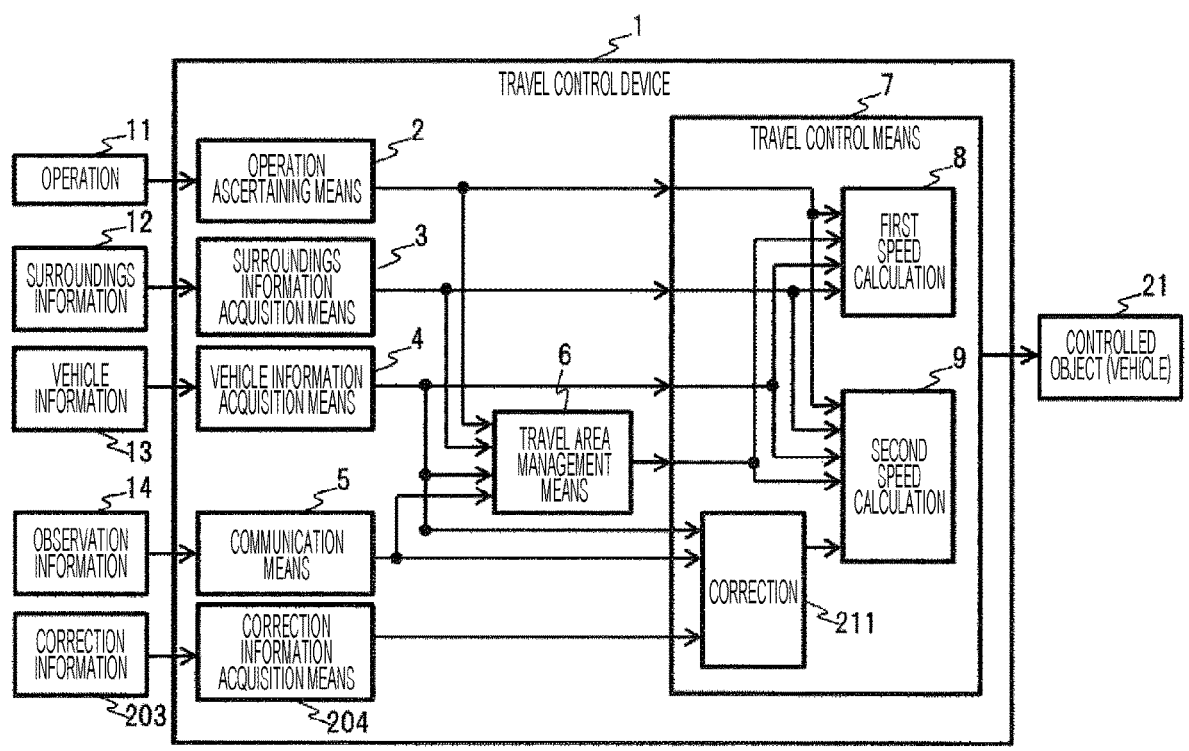
FIG. 21 is an explanatory diagram showing another configuration of the travel control device according to Example 3 of the present invention.

In FIG. 21, a correction information acquisition means 204 acquires the correction information 203 for the observation entities via communication or the like. As long as the observation information 14 and the correction information 203 can be simultaneously obtained from the observation entities, the communication means 5 may also take this role. Alternatively, the correction information 203 possessed by another vehicle may be received by vehicle-to-vehicle communication with another vehicle on which the travel control device of the present invention is mounted. Furthermore, the correction information 203 may be acquired from a different management entity. For example, the correction information for each observation entity installed on the roadside may be collectively acquired from a road administrator by using road-to-vehicle communication such as an optical beacon.

Note that this correction information may be information like the reliability 55 calculated in the observation information integration device in Example 1. For example, when the roadside observation entity is a fixed point observation camera, the detection ability of the camera varies depending on conditions such as day and night, and direct light and backlight. In this case, the reliability of the current environment recognition is received as a predetermined value from the fixed point observation camera, and the travel control means 7 can select only the observation information with a high reliability value to calculate the speeds.

Thus, according to the travel control device 1 of Example 3, when a deviation occurs between the observation information 14, which is from the observation entities existing on the roadside, and the surroundings information 12, which is detected by the sensors 22 to 25 mounted on the host vehicle 21, the past deviation information can be stored to create the correction information. As a result, when traveling the same place for the next time, the roadside observation information can be utilized, and it is possible to provide a travel control device that can expand the speed-enhancing region while ensuring safety.

Figure 22:
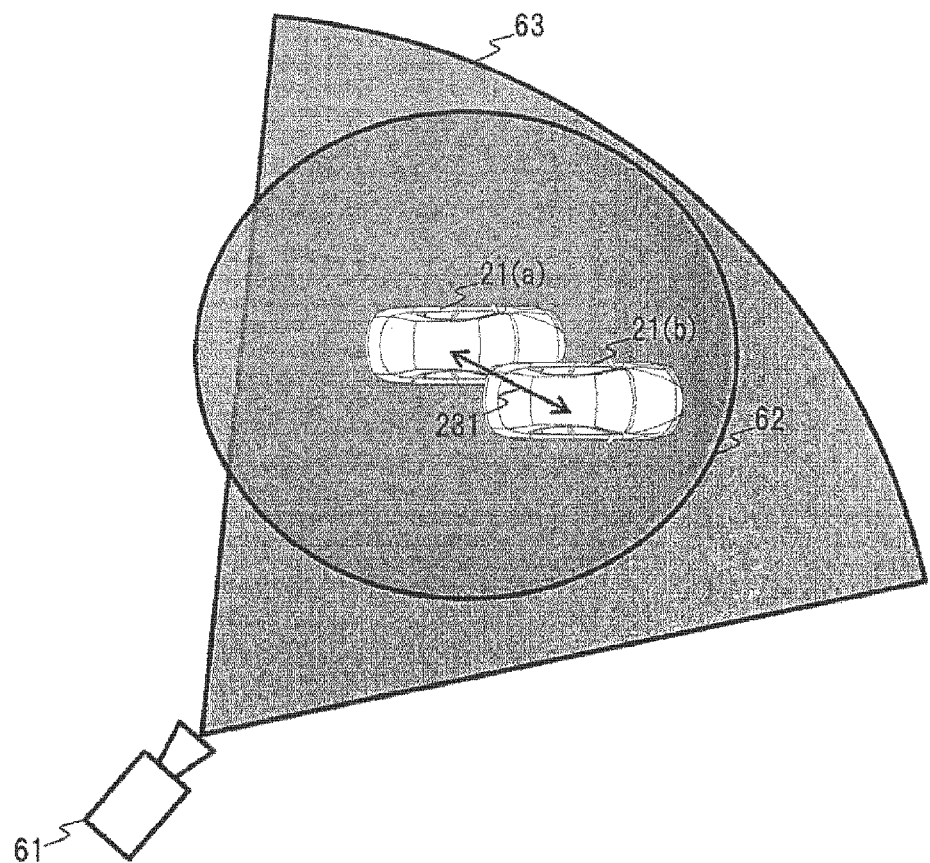
FIG. 22 is an explanatory diagram showing an observation information integration device and a travel control device according to another Example of the present invention.
Figure 22:
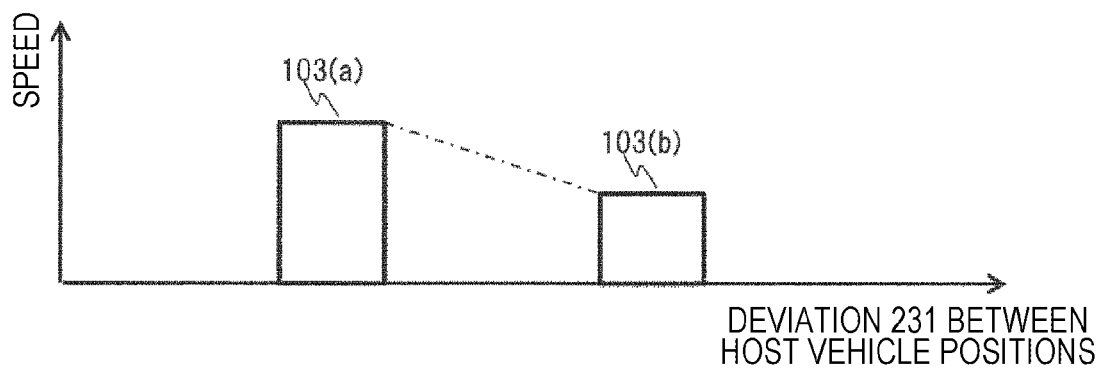

In Examples 1 to 3 described above, the deviation is calculated based on the position deviation between the objects 72 and 73. However, in a case where the roadside observation entity can detect the position of the host vehicle 21, the host vehicle position in the vehicle information 13 from the host vehicle 21 may be compared with the position of the host vehicle 21 in the observation information 14 when the host vehicle 21 passes the detection areas of the observation entities, and the speed may be decided based on this position deviation. For example, as shown in FIG. 22, suppose a positional relationship such that the host vehicle 21 exists within the angular field 63 of the fixed point observation camera 61. At this time, when a deviation 231 occurs between a host vehicle position 21(*a*) calculated based on the vehicle information 13 from the host vehicle and a host vehicle position 21(*b*) detected by the fixed point observation camera 61, it is possible to perform the behavior in which the speed 103 is dropped as the deviation 231 between the host vehicle positions becomes greater as in the bar graph on the lower side of FIG. 22.

Moreover, in Examples 1 to 3 described above, the automated driving of an automobile has been described as an example of the travel control, but the travel control is not limited to the automated driving. The present invention can be applied to various forms of travel control, such as inter-vehicle distance control (active cruise control), lane keeping, automated driving level 2, automated driving level 3 and driverless automated driving.

In Examples 1 to 3 described above, the description has been given with the automobile as an example. However, the present invention can be applied to any device that moves autonomously. For example, the present invention can also be applied to construction machines (such as mining dump trucks) that perform autonomous movement, autonomous mobile mobility (such as driverless automated driving buses, single-seat small automobiles, golf carts, motorcycles and inverted pendulum type mobility), autonomous mobile robots, and the like.

Note that the present invention is not limited to the above Examples and includes various modification examples. For example, the detailed description of the above Examples has been made so that the present invention can be easily understood, and the present invention is not necessarily limited to those including all the constitutions which have been described. Moreover, part of the constitution of one Example can be replaced with the constitutions of other Examples, and the constitutions of other Examples can be added to the constitution of one Example. Furthermore, addition, deletion and replacement of other constitutions can be made to part of the constitution of each Example.

REFERENCE SIGNS LIST

1 travel control device
2 operation ascertaining means
3 surroundings information acquisition means
4 vehicle information acquisition means
6 travel area management means
7 travel control means
8 first speed calculation unit
9 second speed calculation unit
10 travelable area
11 operation
12 surroundings information
13 vehicle information
14 observation information (acquired from outside the host vehicle)
15 detection information (information acquired by the observation information integration device)
21 controlled object (host vehicle)
22 to 25 sensor
26 steering wheel
28 steering control device
32 brake pedal
35 brake control device
37 accelerator pedal
39 acceleration control device
43 communication device
44 display device
51 observation information integration device
52 information integration means
53 reliability calculation means
54 communication means
55 reliability
201 deviation storage means
202 correction information transmission means
203 correction information
204 correction information acquisition means
211 correction unit

The invention claimed is:

1. A travel control system comprising:
an observation information integration device; and
a travel control device,
wherein the observation information integration device comprises:
an information integration means for collecting and integrating external observation information from at least one observation entity of a host vehicle, another vehicle or a roadside observation device;
a reliability calculation means for calculating reliability of the observation information; and
an observation information transmission means for transmitting the observation information and the reliability to the travel control device via communication,
the travel control device comprises:
an operation ascertaining means for ascertaining an operation performed by an operator;
a surroundings information acquisition means for acquiring surroundings information around the host vehicle;
a vehicle information acquisition means for acquiring vehicle information indicating a traveling state of the host vehicle;
a communication means for acquiring the observation information including the reliability from the observation information integration device via communication and transmitting the surroundings information to the observation information integration device via communication;
a travel area management means for managing a travelable area of the host vehicle based on at least one of the operation, the surroundings information, the vehicle information or the observation information; and
a travel control means for controlling travel of the host vehicle based on the operation, the travelable area, the surroundings information, the vehicle information, the observation information and a travel area, and
the travel control means decides a speed of the host vehicle based on a first speed calculated without the observation information in a region where the observation information does not exist, and decides the speed of the host vehicle based on a second speed calculated using integrated observation information obtained by integrating the surroundings information and the observation information in a region where the observation information exists.

2. The travel control system according to claim 1, wherein the travel control means increases the second speed compared with the first speed as an observable area of the integrated observation information is expanded, and suppresses an increase of the second speed as the reliability is small or a deviation of positional information on a same object acquired from a plurality of the observation entities in the observation information is great.

3. A travel control device comprising:
an operation ascertaining means for ascertaining an operation performed by an operator;
a surroundings information acquisition means for acquiring surroundings information around a host vehicle;
a vehicle information acquisition means for acquiring vehicle information indicating a traveling state of the host vehicle;
a communication means for acquiring external observation information from at least one observation entity of another vehicle or a roadside observation device;
a travel area management means for managing a travelable area of the host vehicle; and
a travel control means for controlling travel of the host vehicle based on the operation, the travelable area, the surroundings information, the observation information and the vehicle information,
wherein the travel control means decides a speed of the host vehicle based on a first speed calculated without the observation information in a region where the observation information does not exist, and decides the speed of the host vehicle based on a second speed calculated using integrated observation information obtained by integrating the surroundings information and the observation information in a region where the observation information exists.

4. The travel control device according to claim 3, wherein the travel control means increases the second speed compared with the first speed as an observable area of the integrated observation information is expanded, and suppresses an increase of the second speed in region where a deviation between the surroundings information and the observation information is great when a same object exists in the surroundings information and the observation information.

5. The travel control device according to claim 3, wherein the travel control means increases the second speed as a distance between the host vehicle and an object detected ahead of the host vehicle is long in an observable area of the integrated observation information.

6. The travel control device according to claim 3, wherein the travel control means increases the second speed as a distance between the host vehicle and an object detected on a region along a target travel path of the host vehicle calculated based on the travel area management means is long in an observable area of the integrated observation information.

7. The travel control device according to claim 3, wherein, in an observable area of the integrated observation information, the travel control means sets a value of the second speed to be equal to that of the first speed when a distance between the host vehicle and an object detected ahead of the host vehicle is less than a first distance, sets the second speed to be equal to or less than the first speed when the distance is less than a second distance, and sets the second speed to be equal to or greater than the first speed when the distance is equal to or greater than the second distance, the first distance being a limit of an observable area of the surroundings information, and the second distance being equal to or greater than the first distance and longer than the first distance by a predetermined distance.

8. The travel control device according to claim 3, wherein the travel control means decides the second speed based on the observation information with a small deviation from the surroundings information when same three or more objects exist in the integrated observation information.

9. The travel control device according to claim 3, wherein the travel control means decides the second speed based on positional information on an object detected closest to the host vehicle when a plurality of same objects exist in the integrated observation information.

10. The travel control device according to claim 2, further comprising a deviation storage means for storing the deviation in association with a position of the host vehicle,
wherein the observation information is modified based on correction information indicating the deviation stored, and the speed is decided based on the deviation after being modified.

11. The travel control device according to claim 10, wherein the travel control device stores a plurality of past pieces of the correction information and decides the second speed without observation information as a position with a predetermined value or more of a variation in the correction information.

12. The travel control device according to claim 10, further comprising a correction information transmission means for transmitting, via communication, the correction information stored in the deviation storage means.

13. The travel control device according to claim 2, further comprising a correction information acquisition means for acquiring, via communication, information on an observation error set in association with observation positions in the observation information,
 wherein the observation information is modified based on the observation error, and the speed is decided based on the deviation after being modified.

14. The travel control device according to claim 3, wherein the travel control device calculates a deviation between a position of the host vehicle calculated from the vehicle information and a position of the host vehicle in the observation information and suppresses an increase of the second speed as the deviation is great.

* * * * *